(12) United States Patent
Wright

(10) Patent No.: US 7,799,122 B2
(45) Date of Patent: Sep. 21, 2010

(54) AZO COMPOUNDS

(75) Inventor: Gavin Wright, Blackley (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 425 days.

(21) Appl. No.: 11/989,578

(22) PCT Filed: Jul. 24, 2006

(86) PCT No.: PCT/GB2006/002749

§ 371 (c)(1),
(2), (4) Date: Jan. 28, 2008

(87) PCT Pub. No.: WO2007/012828

PCT Pub. Date: Feb. 1, 2007

(65) Prior Publication Data

US 2010/0151212 A1 Jun. 17, 2010

(30) Foreign Application Priority Data

Jul. 29, 2005 (GB) ................................. 0515589.0

(51) Int. Cl.
C09D 11/02 (2006.01)
C09B 33/02 (2006.01)
B41J 2/01 (2006.01)

(52) U.S. Cl. ...................... 106/31.48; 534/797; 347/100

(58) Field of Classification Search ............... 106/31.48; 534/797; 347/100; 428/195.1
See application file for complete search history.

(56) References Cited

U.S. PATENT DOCUMENTS

| 3,945,990 A | 3/1976 | Ikeda et al. ................ 534/797 |
| 4,605,442 A | 8/1986 | Kawashita et al. ....... 106/31.48 |

(Continued)

FOREIGN PATENT DOCUMENTS

| EP | 0 468 647 A1 | 1/1992 |
| WO | WO 98/12264 | 3/1998 |
| WO | WO 00/58407 | 10/2000 |
| WO | WO 02/50196 A2 | 6/2002 |
| WO | WO 2004/007619 A1 | 1/2004 |
| WO | WO 2006/103414 | 10/2006 |
| WO | WO 2006/103415 | 10/2006 |

OTHER PUBLICATIONS

Reichel et al., "Die Trennungskomponente in Der Synthese Organischer Farbstoffe", Revue Roumaine de Chimie, 9:229-251, Jan. 1964.
Reichel et al. "Chromatographic separation components in the synthesis of organic dyes. XIV. Spectral aspects of the separation effect of central triazinic components" Acad. Rep. Populare Romine Baza cercetari stiint. Timisoara, studii cercetari stiint., Ser. stiinte chim. 7: 99-112 (1960) (Chemical Abstract Service, Document No. 55:73168).

Primary Examiner—Helene Klemanski
(74) Attorney, Agent, or Firm—Morgan Lewis & Bockius LLP

(57) ABSTRACT

A compound of Formula (1) or a salt thereof useful as colorants for use in ink jet printing inks:

Formula (1)

$$A^1-N=N-Q^1-N\underset{R}{\overset{}{\vphantom{|}}}\!\!\overbrace{\phantom{XXX}}^{} N\underset{R}{\overset{}{\vphantom{|}}}\!\!-Q^2-N=N-A^2$$

(triazine ring with OH)

wherein:
$A^1$ is optionally substituted phenyl;
$A^2$ is optionally substituted aryl;
$Q^1$ and $Q^2$ are each independently an optionally substituted phenylene ring which is para connected to the —N=N— and the —NR— groups shown in Formula (1); and
each R independently is H or a substituent;
with the provisos that:
(i) the compound of Formula (1) has at least one group selected from —$SO_3H$ and —$PO_3H_2$ groups;
(ii) the compound of Formula (1) has more groups selected from —$SO_3H$ and —$PO_3H_2$ groups than the total number of —$CO_2H$ and —COSH groups; and
(iii) the compound of Formula (1) is not of Formula (1a):

Formula (1a)

13 Claims, No Drawings

U.S. PATENT DOCUMENTS

| | | | |
|---|---|---|---|
| 4,997,919 A * | 3/1991 | Schaulin | 534/797 |
| 5,374,301 A | 12/1994 | Gregory et al. | 106/31.48 |
| 6,605,144 B1 * | 8/2003 | Watkinson et al. | 106/31.48 |
| 7,144,451 B2 * | 12/2006 | Lehmann et al. | 106/31.48 |
| 7,150,783 B2 * | 12/2006 | Oshaughnessy et al. | 106/31.48 |
| 7,163,576 B2 * | 1/2007 | Oshaughnessy et al. | 106/31.48 |
| 7,704,309 B2 * | 4/2010 | Wright | 106/31.48 |
| 2004/0032474 A1 * | 2/2004 | Lehmann et al. | 347/100 |
| 2004/0068102 A1 * | 4/2004 | Holloway et al. | 534/632 |
| 2009/0053479 A1 * | 2/2009 | Wright | 534/797 |
| 2009/0142553 A1 * | 6/2009 | Wright et al. | 106/31.48 |

* cited by examiner

AZO COMPOUNDS

This invention relates to compounds suitable for use as colorants, to inks containing the compounds and to their uses in ink jet printing ("IJP"). IJP is a non-impact printing technique in which droplets of ink are ejected through a fine nozzle onto a substrate without bringing the nozzle into contact with the substrate.

There are many demanding performance requirements for colorants used in IJP and the inks containing them. For example, the inks desirably provide sharp, non-feathered images having high optical density, good light-fastness, good ozone fastness and a bright colour. The inks are often required to dry quickly when applied to a substrate to prevent smudging, but they should not dry so quickly as to form a crust over the tip of ink jet nozzles and thereby reduce the printer's performance. The inks should also be stable to storage over time without decomposing or forming a precipitate that could block the fine nozzles. In particular, there is an need for compounds suitable for use as colorants which have good light and ozone fastness.

EP 0 486 647 B1 and U.S. Pat. No. 5,374,301 disclose anionic azo compounds. These compounds are described as having good wet-fastness.

A paper published in Acad. Rep. Populare, Romine in 1960, Vol 7, pages 99-112 (as per Chemical Abstract 55:73168) discloses the preparation and the chromatographic separation of certain green dyes suitable for treating cotton.

According to a first aspect of the present invention there is provided a compound of Formula (1) or a salt thereof:

Formula (1)

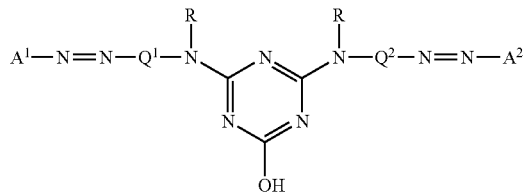

wherein:
$A^1$ is optionally substituted phenyl;
$A^2$ is optionally substituted aryl;
$Q^1$ and $Q^2$ are each independently an optionally substituted, phenylene ring which is para connected to the —N=N— and the —NR— groups shown in Formula (1); and
each R independently is H or a substituent;

with the provisos that:
(i) the compound of Formula (1) has at least one group selected from —$SO_3H$ and —$PO_3H_2$ groups;
(ii) the compound of Formula (1) has more groups selected from —$SO_3H$ and —$PO_3H_2$ groups than the total number of —$CO_2H$ and —COSH groups; and
(iii) the compound of Formula (1) is not of Formula (1a):

Formula (1a)

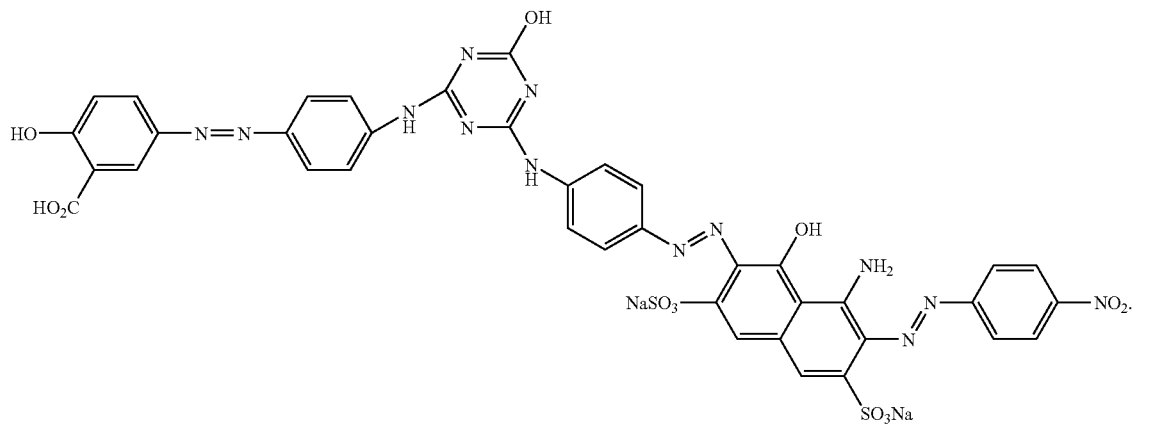

$A^2$ is preferably optionally substituted polycyclic aryl or monocyclic aryl. Preferably, $A^2$ is optionally substituted naphthyl or phenyl.

Preferred polycyclic aryl groups include naphthyl, anthracyl and pyrenyl groups. Preferred monocyclic aryl groups are phenyl groups.

The optional substituents which may be present on $A^1$ and $A^2$ are preferably each independently selected from optionally substituted alkyl, alkoxy, amine, amide, ester, ketone and thioether groups and from halo, acid, —$CF_3$, —CN, —$NO_2$, azo (especially aryl azo) and —OH groups.

Preferred optionally substituted alkyl groups include $C_{1-8}$-alkyl, more preferably $C_{1-4}$-alkyl, in each case optionally carrying a substituent, preferably a substituent selected from halo, carboxy, alkoxy, hydroxy and sulfo. Examples of optionally substituted alkyl groups include methyl, ethyl, n-butyl, sec-butyl, trifluoromethyl, hydroxyethyl, sulfopropyl and carboxyethyl.

Preferred optionally substituted alkoxy groups include $C_{1-8}$-alkoxy, more preferably $C_{1-4}$-alkoxy, in each case optionally carrying a substituent, preferably a substituent selected from hydroxy, sulfo, halogen and carboxy. Examples of optionally substituted alkoxy groups include methoxy, ethoxy, butoxy, carboxypropoxy, carboxyethoxy, hydroxyethoxy and chloroethoxy.

Preferred optionally substituted amine groups are of the formula —$NR^1R^2$ wherein $R^1$ and $R^2$ are each independently H or optionally substituted alkyl, aryl or heteroaryl, or $R^1$ and $R^2$ together with the nitrogen atom to which they are attached form an optionally substituted 5- or 6-membered ring (e.g. a piperidine, pyrrolidone, pyridine, piperidine or morpholine ring).

When $R^1$ and $R^2$ together with the nitrogen atom to which they are attached form an optionally substituted 5- or 6-membered ring, the optional substituents are preferably selected from alky, alkoxy, halo, acid, hydroxy, cyano and nitro groups.

Preferred optionally substituted amide groups are of the formula —NHC(O)NR$^1$R$^2$, —C(O)NR$^1$R$^2$, —S(O)$_2$NR$^1$R$^2$ or —NHC(O)R$^3$, wherein R$^3$ is H or optionally substituted alkyl, aryl or heteroaryl and R$^1$ and R$^2$ are as hereinbefore defined.

Preferred optionally substituted ester groups are of the formula —C(O)OR$^4$ or —S(O)OR$^4$, wherein R$^4$ is optionally substituted alky, aryl or hetero aryl.

Preferred optionally substituted ketone groups are of the formula —C(O)R$^4$ or —S(O)R$^4$, wherein R$^4$ is as hereinbefore defined.

Preferred acid groups are —SO$_3$H and —PO$_3$H$_2$ groups.

Preferred optionally substituted thioether groups are of the formula —SR$^4$, wherein R$^4$ is as hereinbefore defined.

Preferred halo groups are Cl, F, Br and I.

Preferably, A$^1$ and A$^2$ each independently have from 1 to 5 substituents, more preferably 1, 2 or 3 substituents, preferably selected from —SO$_3$H and —PO$_3$H$_2$.

Preferably both A$^1$ and A$^2$ are free from —COSH and —CO$_2$H substituents, more preferably both A$^1$ and A$^2$ are free from groups other than —SO$_3$H and —PO$_3$H$_2$. In one embodiment A$^1$ and A$^2$ each carry one, two or three groups selected from —SO$_3$H and —PO$_3$H$_2$ groups and are free from further substituents.

In another embodiment all of the —SO$_3$H and —PO$_3$H$_2$ groups present in the compound of Formula (1) are attached to A$^1$ and/or A$^2$.

The optionally substituted phenylene rings represented by Q$^1$ and Q$^2$ may each independently be a monocyclic ring (e.g. Q$^1$ and Q$^2$ are each independently an optionally substituted 1,4-phenylene group) or be part of polycyclic ring (e.g. Q$^1$ and Q$^2$ are each independently part of an optionally substituted 1,4-naphthylene or 1,4-indolene group). The optionally substituted polycyclic ring may be an arylene or a heteroarylene ring. Preferred polycyclic heteroarylene rings are those comprising a 1,4-phenylene ring condensed with a 5- or 6-membered ring comprising one or more nitrogen, sulphur, oxygen or phosphorus atoms in the 5- or 6-membered ring (e.g. an indole group para connected to both the —N=N— and the —NR— groups in Formula (1)).

Preferably Q$^1$ and Q$^2$ are each independently part of an optionally substituted naphthylene or are phenylene, more preferably both Q$^1$ and Q$^2$ are optionally substituted phenylene, in each case para connected to both the —N=N— and the —NR— groups shown in Formula (1).

The optional substituents which may be present on Q$^1$ and Q$^2$ are preferably any of those mentioned above for A$^1$ and A$^2$.

The optional substituents which may be present on Q$^1$ and Q$^2$ are preferably selected from C$_{1-4}$-alkoxy (especially methoxy and ethoxy), C$_{1-4}$-alkyl (especially methyl), —NHCONH$_2$, —NHSO$_2$—C$_{1-4}$-alkyl (especially —NHSO$_2$CH$_3$), —SO$_3$H and —PO$_3$H$_2$.

Preferably Q$^1$ and Q$^2$ each have one substituent.

Preferably each R independently is H, optionally substituted alkyl or optionally substituted aryl. Preferred optionally substituted alkyl and optionally substituted aryl groups are as mentioned above. More preferably each R independently is H or C$_{1-4}$-alkyl, especially H.

The compounds of Formula (1) exist in tautomeric forms other than those shown in this specification and such tautomers are included within the scope of the present invention and the claims.

Preferred salt forms of the compounds of Formula (1) are, for example alkali metal salts (especially lithium, sodium, potassium), ammonium, substituted ammonium and mixed salts thereof. Preferably, the salts of the compounds of Formula (1) are soluble in water.

Preferred ammonium and substituted ammonium salts are ammonium and alkyl or aryl substituted ammonium (e.g. ammonium, alkanolammonium, pyridinium, piperidinium and morpholinium).

It is especially preferred that the compounds of Formula (1) are in the form of a sodium, lithium, potassium or ammonium salt or a mixture thereof.

Preferably, the compound of Formula (1) has no —CO$_2$H or —COSH substituents.

Preferably, the compound of Formula (1) has from 1 to 6 and especially from 2 to 4 groups selected from —SO$_3$H and —PO$_3$H$_2$ groups.

Preferably, the compound of Formula (1) contains only two azo groups. Compounds of Formula (1) containing only two azo groups have better colour and chroma than those containing, for example, three azo groups. This better colour and chroma means that prints obtained from inks containing the compounds of the present invention are brighter, more vivid and are more suited to ink jet printing of photographs.

Preferably, the compound of Formula (1) is free from phenolic groups as these may reduce the chroma, brightness and ozone fastness of the compounds of the present invention.

It is also preferred that the compound of Formula (1) is free from nitro groups (—NO$_2$).

Preferably, the compound of Formula (1) is a dye, more preferably a water-soluble dye. Preferably, the compounds of Formula (1) have a solubility in water of at least 3%, more preferably at least 5% and especially at least 10% by weight.

Preferably, the compound of Formula (1) is yellow, orange or brown in colour. Preferably, the compounds of Formula (1) are yellow when dissolved in water to a concentration of 5% by weight of dye in solution.

The compounds of the present invention are useful for preparing inks which, when printed, exhibit particularly good ozone fastness, optical density and especially good light fastness.

Compounds of Formula (1) are preferably free from fibre reactive groups because such groups tend to reduce the long-term storage stability of inks. The term fibre reactive group is well understood in the art and is used for example in EP-0356014 A1. Fibre reactive groups are capable, under suitable conditions, of reacting with the hydroxy groups present in cellulosic fibres or with the amino groups present in natural fibres to form a covalent linkage between the fibre and the compound.

Preferably, A$^2$ is optionally substituted phenyl or naphthyl and both Q$^1$ and Q$^2$ are optionally substituted phenylene.

Particularly, preferred compounds of Formula (1) are of Formulae (2) to (32) or a salt thereof:

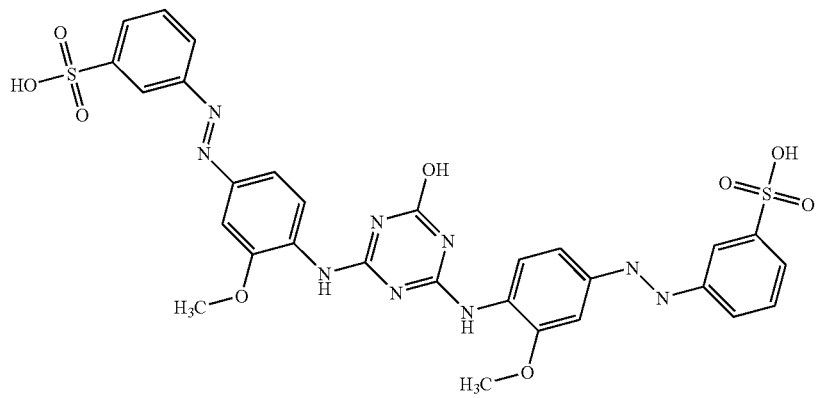
Formula (2)
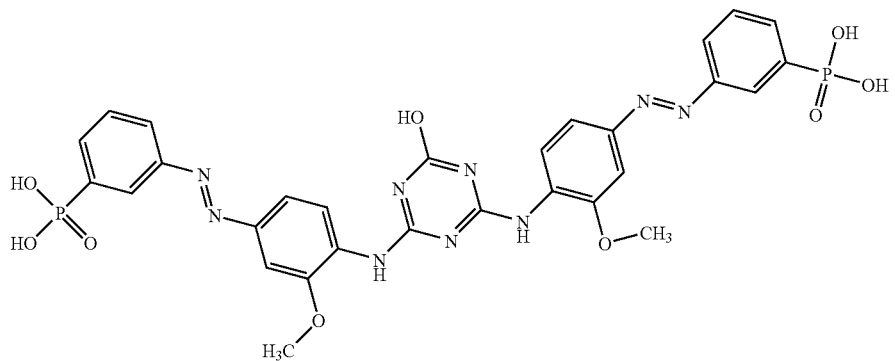
Formula (3)
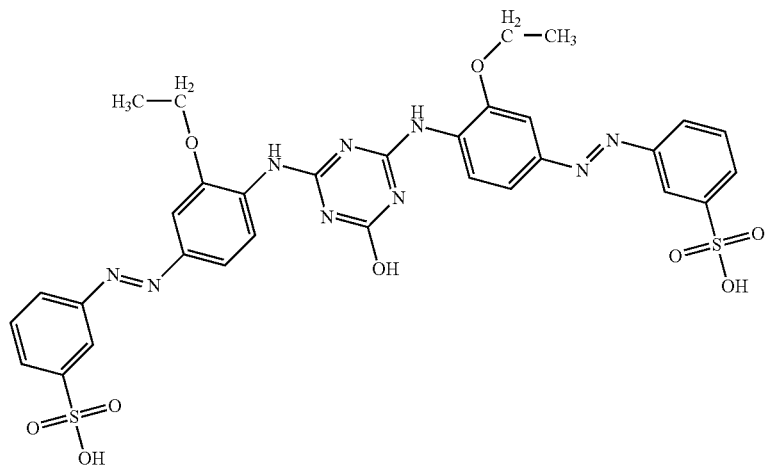
Formula (4)
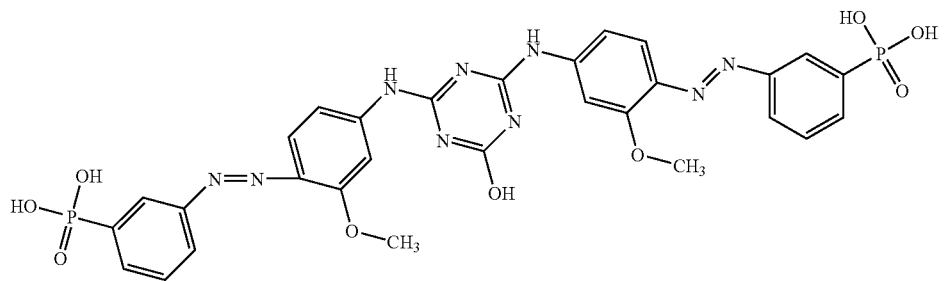
Formula (5)

-continued
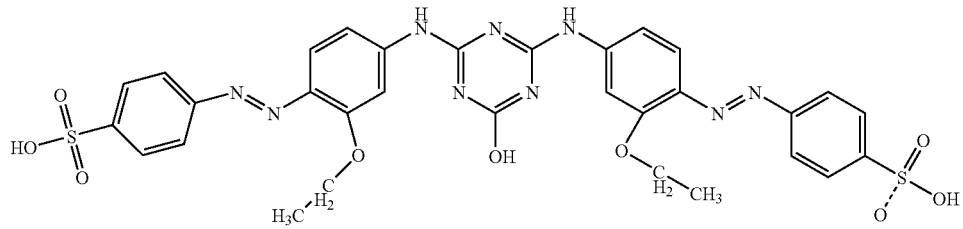
Formula (6)
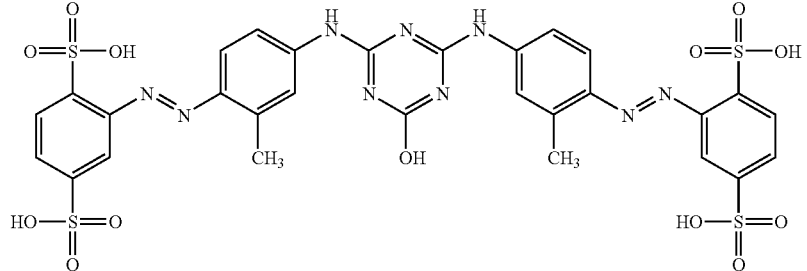
Formula (7)
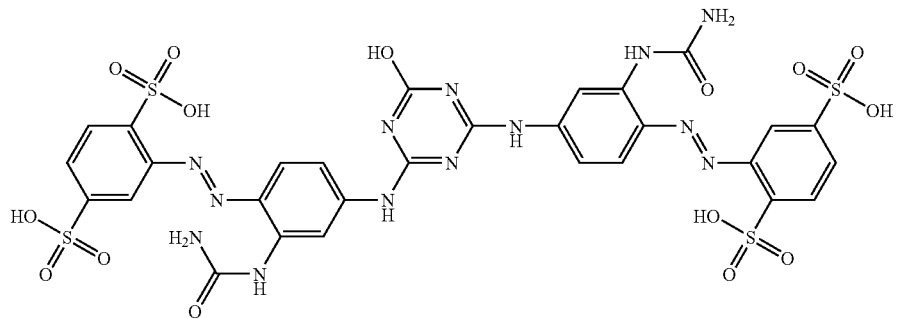
Formula (8)
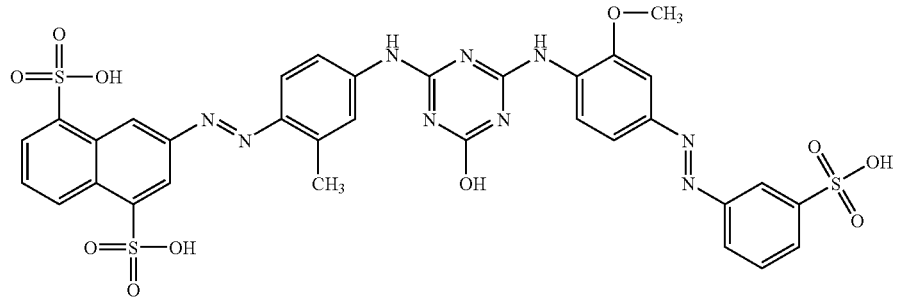
Formula (9)
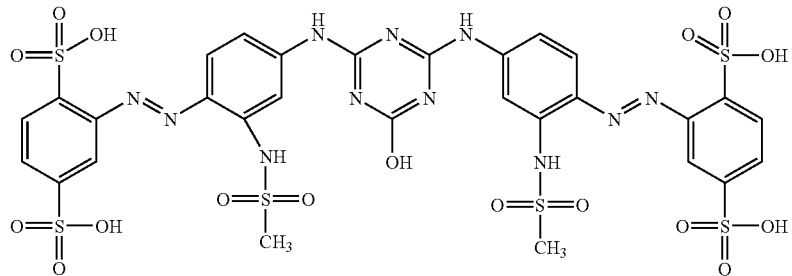
Formula (10)

Formula (11)
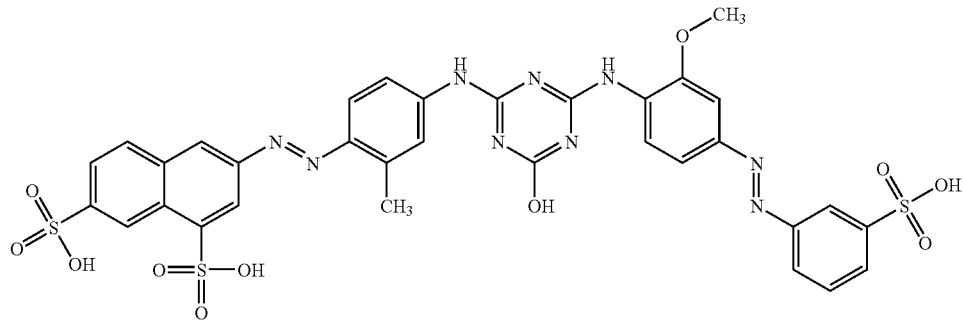
Formula (12)
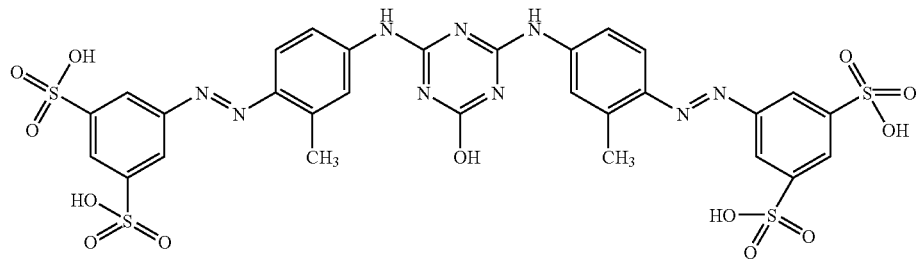
Formula (13)
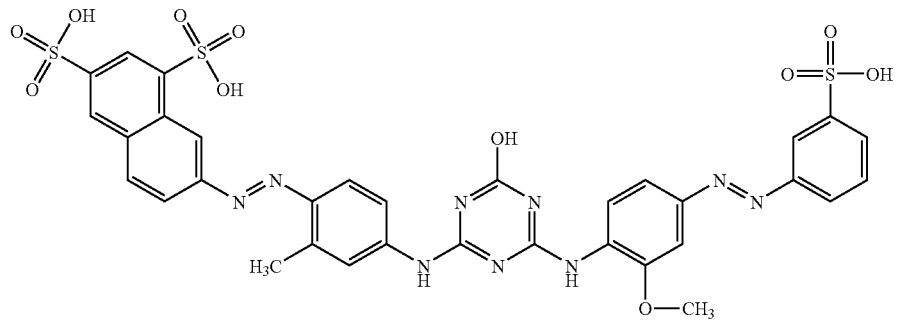
Formula (14)
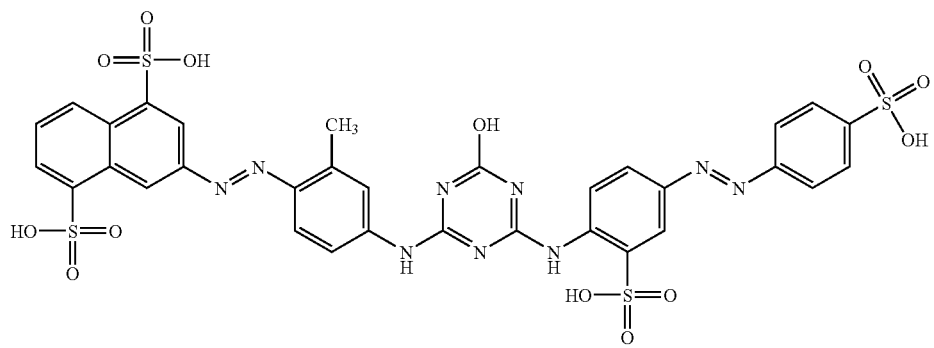
Formula (15)
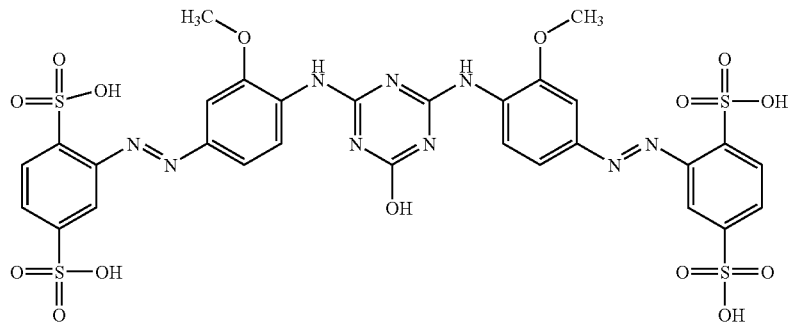

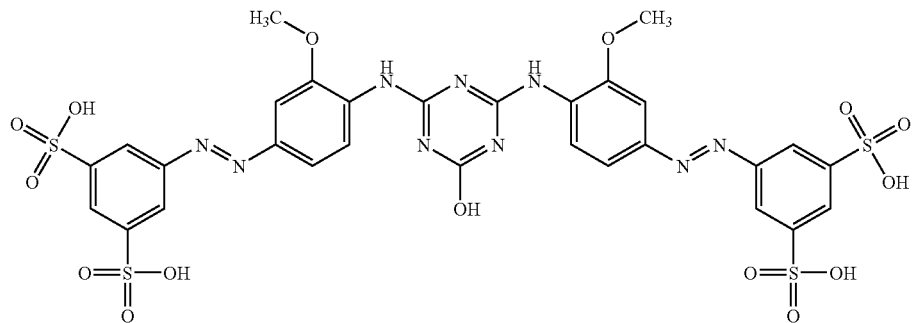
Formula (16)
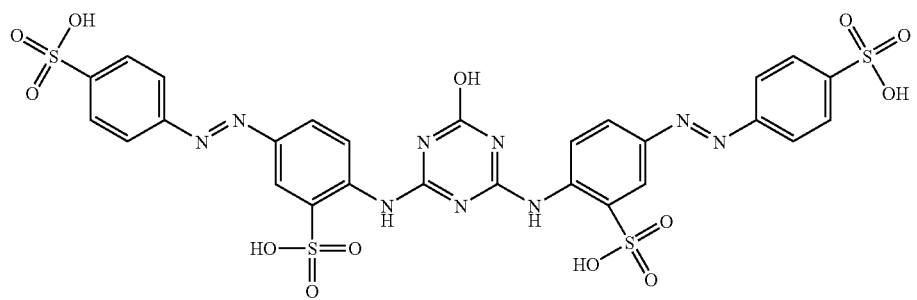
Formula (17)
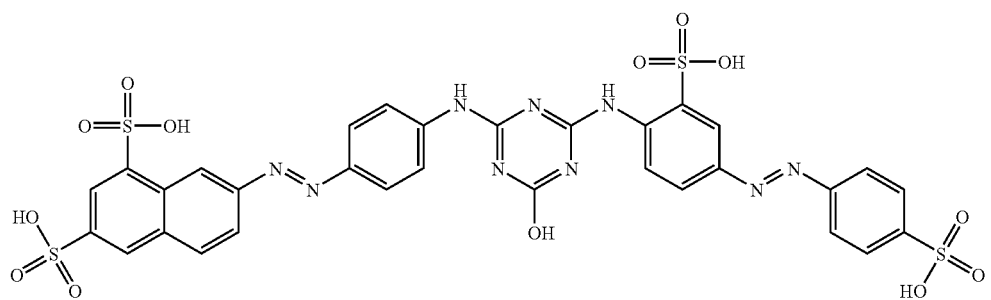
Formula (18)
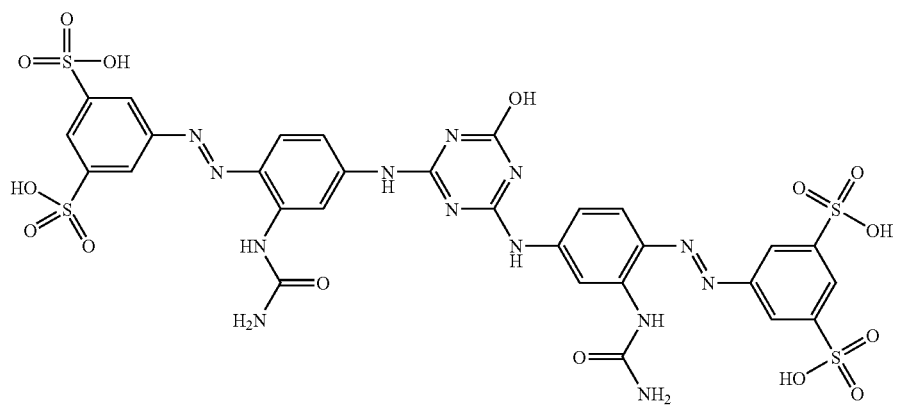
Formula (19)

-continued
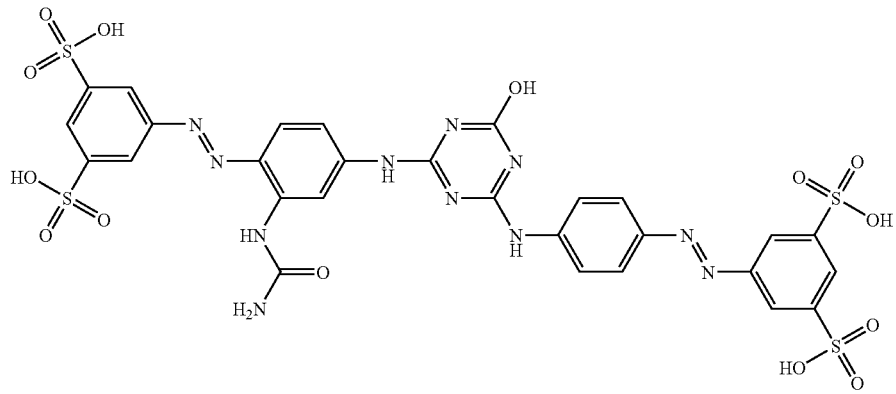
Formula (20)
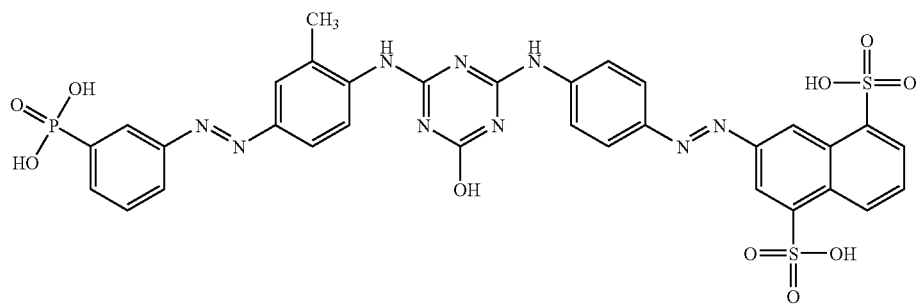
Formula (21)
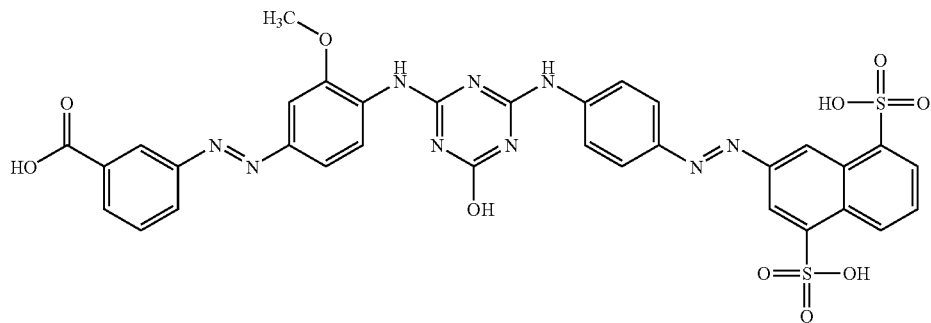
Formula (22)
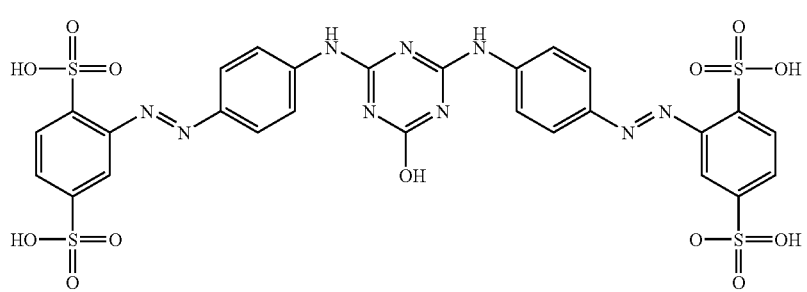
Formula (23)

-continued
Formula (24)
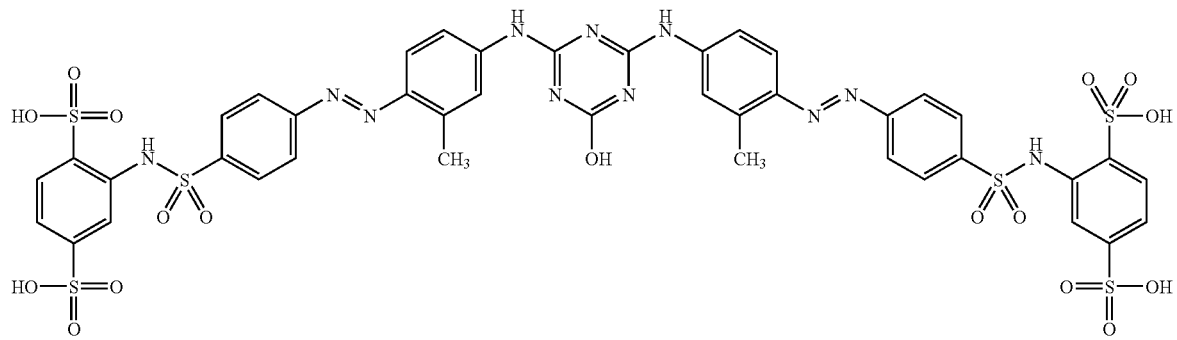
Formula (25)
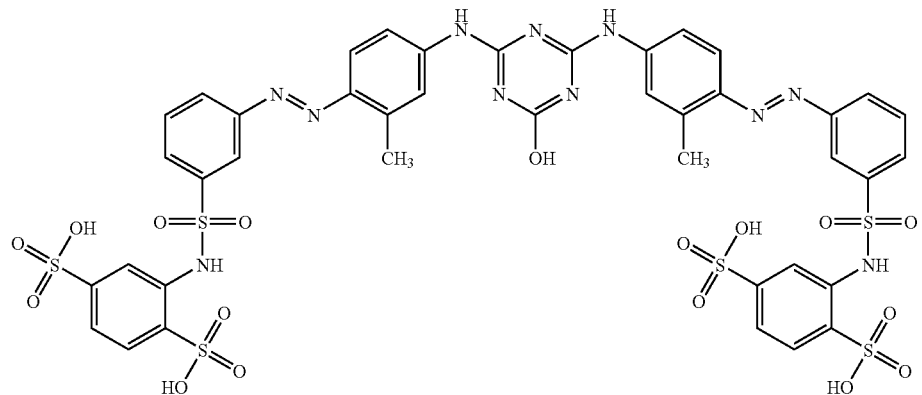
Formula (26)
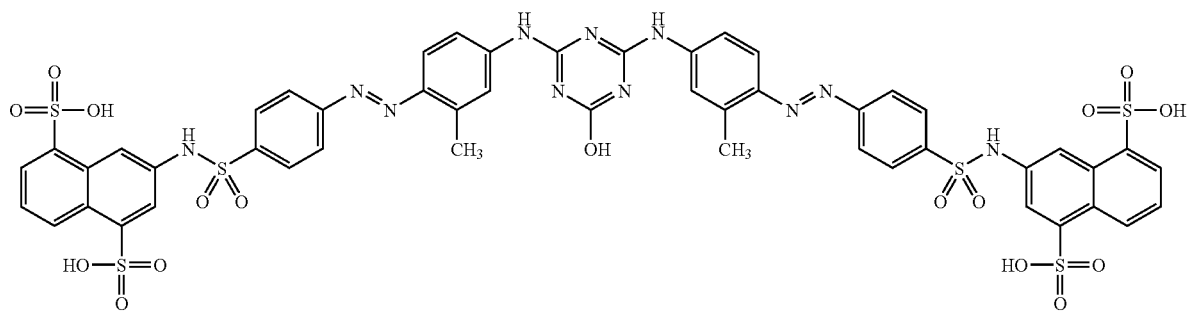
Formula (27)
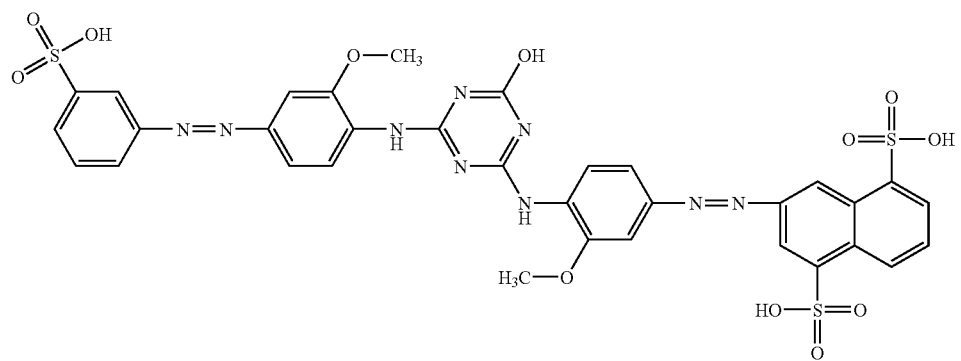

-continued
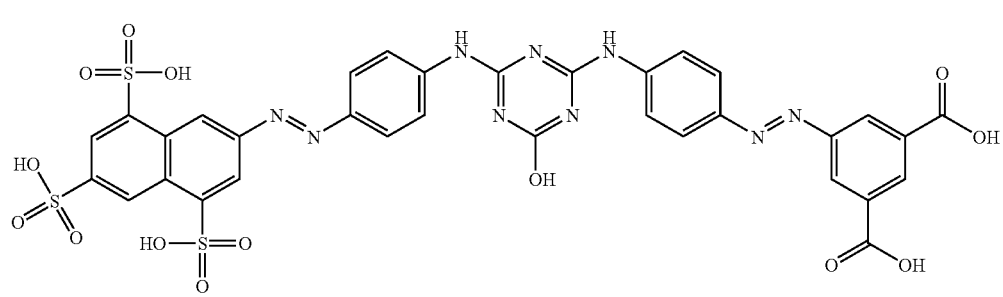
Formula (28)
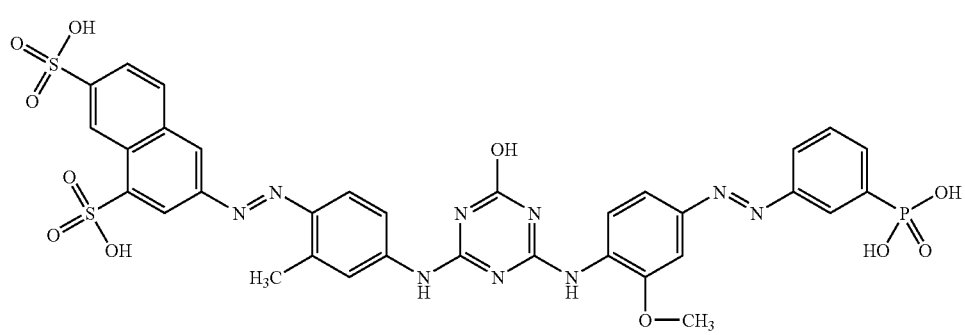
Formula (29)
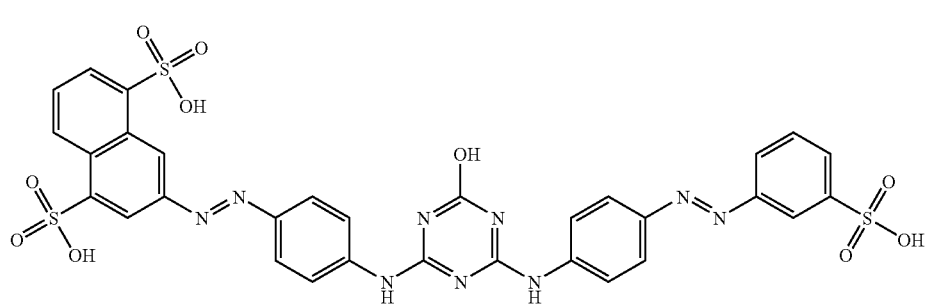
Formula (30)
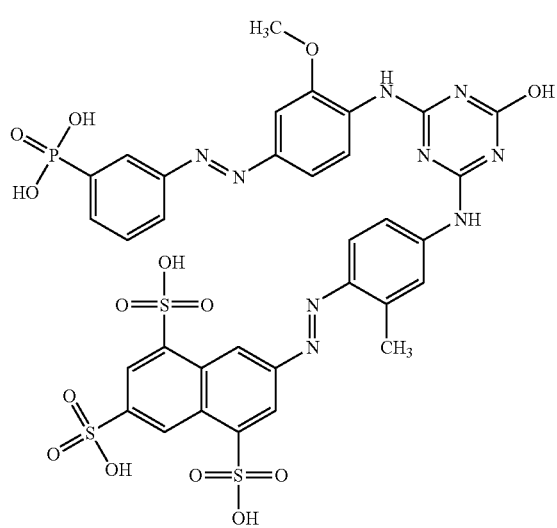
Formula (31)

-continued

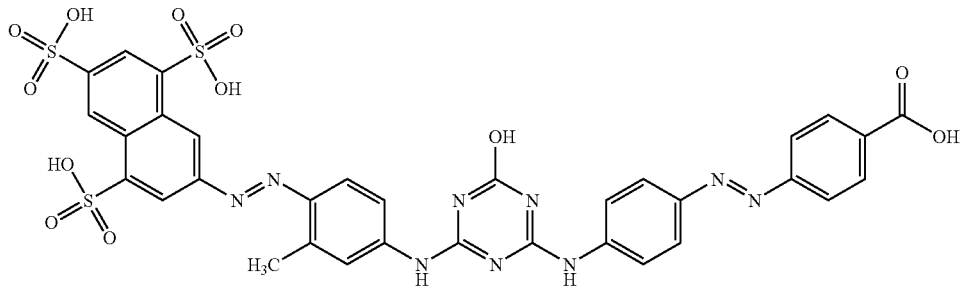

Formula (32)

The compound of Formula (8) or a salt thereof are particularly preferred due to their even better light- and ozone-fastness.

In further embodiments one or more of the following categories of compound are excluded from the scope of Formula (1):

Category 1: Compounds in which $A^1$ is 4-sulfophenyl and $A^2$ is 1,5-disulfonaphth-3-yl.
Category 2: Compounds in which $A^1$ is not 4-sulfophenyl and $A^2$ is 1,5-disulfonaphth-3
Category 3: Compounds in which $A^1$ and $A^2$ are identical optionally substituted phenyl groups and $Q^1$ and $Q^2$ are identical.
Category 4: Compounds in which $A^1$ and $A^2$ are identical optionally substituted phenyl groups and $Q^1$ and $Q^2$ are different.
Category 5: Compounds in which $A^1$ and $A^2$ are not identical $Q^1$ and $Q^2$ are identical and $A^2$ is not 1,5-disulfonaphth-3-yl.
Category 6: Compounds in which $A^1$ and $A^2$ are not identical, $Q^1$ and $Q^2$ are not identical and $A^2$ is not 1,5-disulfonaphth-3-yl.

The compounds of Formula (1) or a salt thereof may be prepared by, for example, the hydrolysis of monochloro triazinyl compound of Formula (33):

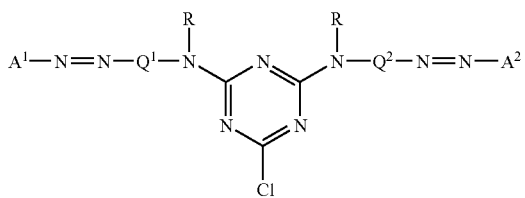

Formula (33)

wherein $A^1$, $A^2$, $Q^1$, $Q^2$ and R are as hereinbefore defined.

Preferably, the hydrolysis is performed in an alkaline solution containing sodium or lithium hydroxide at a temperature of 60 to 80° C. for a period of 4 to 10 hours.

The compounds of Formula (33) may be prepared by the condensation of cyanuric chloride with approximately 1 molar equivalent of a compound of Formula (34a) and approximately 1 molar equivalent of a compound of Formula (34b). Symmetrical compounds of Formula (33) in which $A^1=A^2$, $Q^1=Q^2$ and both R groups are the same may be prepared by condensing cyanuric chloride with approximately 2 molar equivalents of the compound of Formula (34a). The condensation is preferably performed in aqueous solution at, a temperature of from 0 to 40° C. and a pH of from 5 to 7:

$A^1$-N=N-$Q^1$-NRH    Formula (34a)

$A^2$-N=N-$Q^2$-NRH    Formula (34b)

wherein $A^1$, $A^2$, $Q^1$, $Q^2$ and R are as hereinbefore defined.

The compounds of Formula (34a) may be prepared by diazotising a compound of the Formula $A^1$-$NH_2$ to give a diazonium salt and coupling the resultant diazonium salt with a compound of Formula $Q^1$-NRH, wherein $A^1$, $Q^1$ and R are as hereinbefore defined.

The compounds of Formula (34b) may be prepared in an analogous manner to those of Formula (34a).

The diazotisation is preferably performed at a temperature below 20° C., more preferably at a temperature from 0° C. to 5° C. Preferably, the diazotisation is performed in a liquid comprising water, preferably having a very acidic pH (below 3). Mineral acids (e.g. HCl or $H_2SO_4$ or mixtures thereof are typically used to achieve such an acidic pH.

The coupling reaction is preferably performed at a temperature of from 0 to 5° C., typically for a period of 1 to 6 hrs. It is often desirable to add a buffer (e.g. sodium acetate) to adjust the pH to 4 to 5. The coupling reaction is preferably performed in a liquid comprising water. The coupling reaction is preferably continued for a further period of 16 hours at 25° C.

As mentioned above the compound of Formula (1) may be in the form of a free acid or a salt. The salts of Formula (1) may be prepared by, for example, using precursors (e.g. compounds of Formula (34a and/or 34b)) which are in the form of a salt, or the compound of Formula (1) in the form of the free-acid may be neutralised with a base (e.g. sodium, lithium, or potassium hydroxide, ammonia, a substituted ammonium compound or an alkanolamine). It is also possible to exchange the cation in the salt, for example by using a cation exchange resins.

According to a second aspect of the present invention there is provided an ink comprising a compound of Formula (1) or a salt thereof and a medium.

The medium may be a low melting point solid but is preferably a liquid.

The liquid medium preferably comprises water and an organic solvent.

A preferred ink according to the second aspect of the present invention comprises:

(a) from 0.01 to 30 parts of a compound of Formula (1) or salt thereof; and (b) from 70 to 99.99 parts of a liquid medium;

wherein all parts are by weight and the number of parts of (a)+(b)=100.

The number of parts by weight of component (a) is preferably from 0.01 to 25, more preferably 0.1 to 20, especially from 0.5 to 15, and more especially from 1 to 5 parts. The number of parts by weight of component (b) is preferably from 99.99 to 75, more preferably from 99.9 to 80, especially from 99.5 to 85, and more especially from 99 to 95 parts. The number of parts (a)+(b) is 100 and all parts mentioned here are by weight.

Preferably, the compound of Formula (1) or a salt thereof is completely dissolved in the liquid medium. Preferably, the compound of Formula (1) or a salt thereof have a solubility in the liquid medium at 20° C. of at least 10% by weight. This allows the preparation of ink concentrates which may be used to prepare more dilute inks.

When the liquid medium comprises a mixture of water and an organic solvent, the weight ratio of water to organic solvent is preferably from 99:1 to 1:99, more preferably from 99:1 to 50:50 and especially from 95:5 to 80:20.

Preferably, the organic solvent is a water-miscible organic solvent or a mixture of such solvents. Preferred water-miscible organic solvents include: $C_{1-8}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, 1,2-hexanediol, ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide and sulfolane. Preferably, the liquid medium comprises water and 2 or more, especially from 2 to 8, water-soluble organic solvents.

In one embodiment the ink comprises a compound of Formula (1) or a salt thereof, a liquid medium and optionally a pigment (e.g. a yellow pigment). In this embodiment the liquid medium preferably comprises water and a mixture of glycol monoether and 1,2-alkane diol. It is especially preferred that the weight ratio of glycol monoether to 1,2-alkane diol is 1:2 to 2:1 by weight.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Examples of further suitable liquid media comprising a mixture of water and one or more organic solvents are described in U.S. Pat. No. 4,963,189, U.S. Pat. No. 4,703,113, U.S. Pat. No. 4,626,284 and EP 4,251,50A which are incorporated herein by reference thereto.

Preferably, the low melting point solid is solid at 25° C. and melts at a temperature above 50° C. More preferably, the low melting point solid has a melting point in the range from 60° C. to 125° C.

Suitable media which melt in this temperature range include long chain fatty acids, sulfonamides or alcohols, preferably those having $C_{18-24}$ chains. The compound of Formula (1) may be dissolved in the low melting point solid or may be finely dispersed in it.

Preferably, the ink is free from reactive dyes, especially those having halo triazine groups.

The inks according to the second aspect of the present invention may comprise one or more compounds of Formula (1) or salts thereof.

The inks according to the second aspect of the present invention may comprise one or more additional colorants other than a compound of Formula (1) or salt thereof. The additional colorant may be a pigment but is preferably a dye.

When the additional colorant is a pigment the pigment is preferably a yellow pigment, examples of which include yellow monoazo pigments such as C.I. Pigment Yellow-1, -2, -3, -10, -60, -73, -74, -75, -120, -151 and -175; disazo pigments such as C.I. Pigment Yellow-12, -13, -14, -16, -17, -81, -83, -93, -95, 126, -128, -174 and -180; isoindolinone pigments such as C.I. Pigment Yellow-109, -110, -139 and -185; anthraquinone pigments such as C.I. Pigment Yellow-23, -108 and -147; and quinophthalone pigments such as C.I. Pigment Yellow-138.

When the additional colorant is a dye the dye is preferably a yellow dye mentioned in the Colour Index International, especially C.I. Direct Yellow-1, -2, -4, -8, -11, -12, -26, -27, -28, -33, -34, -41, -44, -48, -86, -87, -88, -132, -135, -142 or -144; and/or C.I. Acid Yellow-1, -3, -4, -7, -11, -12, -13, -14, -19, -23, -25, -34, -38, -41, -42, -44, -53, -55, -61, -71, -76 or -79. Further additional dyes are described in U.S. Pat. No. 6,878,196 (especially dyes 1, 6B, 7B and 22B which are incorporated herein by reference thereto) and U.S. Pat. No. 6,855,195.

Typically the dye of Formula (1) and the additional colorant are included in the ink in a weight ratio of 1:2 to 2:1.

The ink may contain additives suitable for use in ink jet printing inks, for example viscosity and surface tension modifiers, corrosion inhibitors, biocides (e.g. Proxel™ Biocide), kogation reducing additives, anti-cockle agents (e.g. to reduce paper curling) and surfactants (e.g. Olefin E 1010) which may be ionic or non-ionic.

The pH of the ink is preferably from 4 to 11, more preferably from 7 to 10.

The viscosity of the ink is preferably less than 50 mPa·s, more preferably less that 20 mPa·s and especially less than 5 mPa·s. The viscosity is preferably measured at a temperature of 25° C. More preferably, the viscosity is measured at 100 rpm using a Bohlin rheometer fitted with a cone and plate geometry at a temperature of 25° C. The viscosity behaviour of the ink as a function of shear rate is preferably Newtonian. That is to say, for example, over the range corresponding to shear rates of 1 to 1000 rpm the viscosity is substantially unaffected by the shear rate.

Thermal ink jet printers are particularly sensitive to minor impurities in the ink. Such impurities may corrode the resistors or form a deposit on the resistors used to fire ink from the printheads. This may result in reduced print quality.

Thus one embodiment of the second aspect of the present invention provides an ink jet printing ink having a concentration of halide ions of less than 500 parts per million and more preferably less than 100 parts per million. It is especially preferred that the ink has less than 100, more preferably less than 50 parts per million in total of divalent and trivalent metals. Parts per million refer to parts by weight of the relevant ions or metals relative to the total weight of the ink. Any suitable means to remove chloride ions and/or di and trivalent metals may be employed, e.g. ion exchange and ultra-filtration.

Preferably, the ink according to the second aspect of the present invention has been filtered through a filter having a mean pore size of less than 10 microns, more preferably less than 5 microns and especially less than 1 micron. The filtration substantially removes oversized particulate matter which might otherwise tend to black the nozzles in the ink jet printer head.

The inks of the present invention preferably form the yellow ink of an ink set comprising a yellow, magenta, cyan and black ink. Typically, in such an ink set the magenta ink contains, for example, C.I. Acid Red 52 and/or Pro-Jet™ Fast Magenta 2, the cyan ink contains, for example, C.I. Direct Blue 86, 199 and/or Pro-Jet™ Fast Cyan 2 and the black ink contains, for example, C.I. Direct Black 199 and/or Pro-Jet™ Fast Black 2 (Pro-Jet is a trade mark of Fujifilm Imaging Colorants Limited).

According to a third aspect of the present invention there is provided a process for printing an image on a substrate which comprises applying to the substrate by means of an ink jet printer an ink comprising a compound of Formula (1) or a salt thereof:

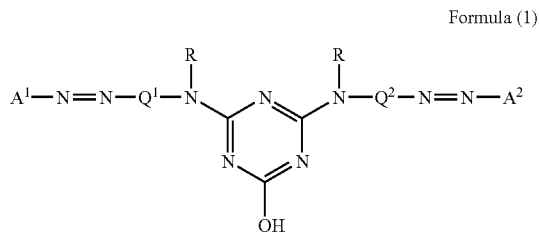

Formula (1)

wherein:
  $A^1$ is optionally substituted phenyl;
  $A^2$ is optionally substituted aryl;
  $Q^1$ and $Q^2$ are each independently an optionally substituted phenylene ring which is para connected to the —N=N— and the —NR— groups shown in Formula (1); and
  each R independently is H or a substituent;

with the provisos that:
  (i) the compound of Formula (1) has at least one group selected from —$SO_3H$ and —$PO_3H_2$ groups; and
  (ii) the compound of Formula (1) has more groups selected from —$SO_3H$ and —$PO_3H_2$ groups than the total number of —$CO_2H$ and —COSH groups.

Preferably, the compound of Formula (1) or a salt thereof used in the process according to the third aspect of the present invention is as described above.

Preferably, the ink is as defined in the second aspect of the present invention.

According to a fourth aspect of the present invention there is provided a substrate (preferably paper, an overhead projector slide or a textile material) printed with an ink comprising a compound of Formula (1) or a salt thereof according to the first aspect of the present invention. Preferably, the ink is as defined in the second aspect of the present invention.

According to a fifth aspect of the present invention there is provided an ink jet printer cartridge comprising a chamber and ink, wherein the ink is present in the chamber and the ink comprises a compound of Formula (1) or a salt thereof according to the first aspect of the present invention. Preferably, the ink is as defined in the second aspect of the present invention.

According to a sixth aspect of the present invention there is provided the use of a compound of Formula (1) or a salt thereof for preparing an ink jet printing ink:

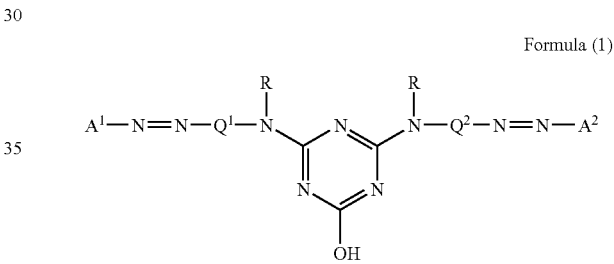

Formula (1)

wherein:
  $A^1$ is optionally substituted phenyl;
  $A^2$ is optionally substituted aryl;
  $Q^1$ and $Q^2$ are each independently an optionally substituted phenylene ring which is para connected to the —N=N— and the —NR— groups shown in Formula (1); and
  each R independently is H or a substituent;

with the provisos that:
  the compound of Formula (1) has at least one group selected from —$SO_3H$ and —$PO_3H_2$ groups;
  (ii) the compound of Formula (1) has more groups selected from —$SO_3H$ and —$PO_3H_2$ groups than the total number of —$CO_2H$ and —COSH groups and said ink jet printing ink comprising either water and at least one water-miscible organic solvent or a low melting point solid.

The ink is preferably as hereinbefore described.

The invention is further illustrated by the following examples in which all parts and percentages are by weight unless otherwise stated.

EXAMPLE 1

Dye (1)

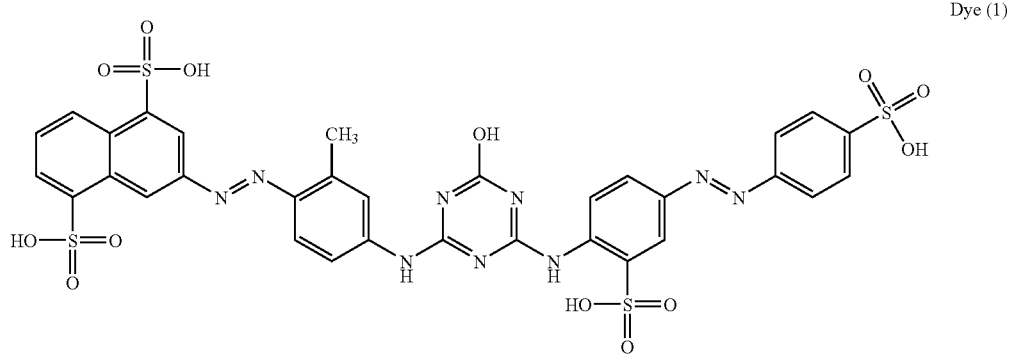

Dye (1)

Dye (1) was prepared by stages (a) to (c) described below:

Stage (a) Preparation of Intermediate (1a)

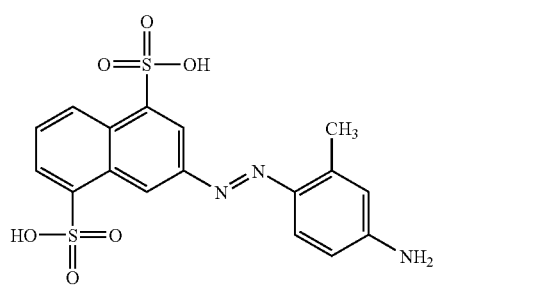

Intermediate (1a)

3-Aminonaphthalene-1,5-disulfonic (110 g, 0.43 mol) was dissolved in water (800 ml) at a pH of 7 by the addition of 2N sodium hydroxide solution followed by the addition of sodium nitrite (33.1 g, 0.48 mol). The resultant solution was added dropwise to a mixture of concentrated hydrochloric acid (120 ml) and water (200 ml) at a temperature of from 0 to 5° C. to produce a diazonium salt.

The diazonium salt was stirred for 1 hour at a temperature of 0 to 5° C. and then any excess nitrous acid was destroyed by adding sulfamic acid. A solution of m-toluidine (46 g, 0.43 mol) was added dropwise at a temperature of from 0 to 5° C. and the pH was adjusted to 4-5 by adding sodium acetate. The resultant mixture was stirred for 4 hours at a temperature of 0 to 5° C. and then at 20° C. for a further 16 hours.

The resultant product was precipitated by the addition of salt (NaCl), the precipitate was collected by filtration and then dissolved in water (1000 ml) at a pH of 7 obtained by the addition of sodium hydroxide solution. The product was precipitated by the addition of sodium chloride (200 g), collected by filtration and dried in an oven at 60° C. to produce 82 g of a Intermediate (1a) in the form of a red solid.

Stage (b) Preparation of Intermediate (1b)

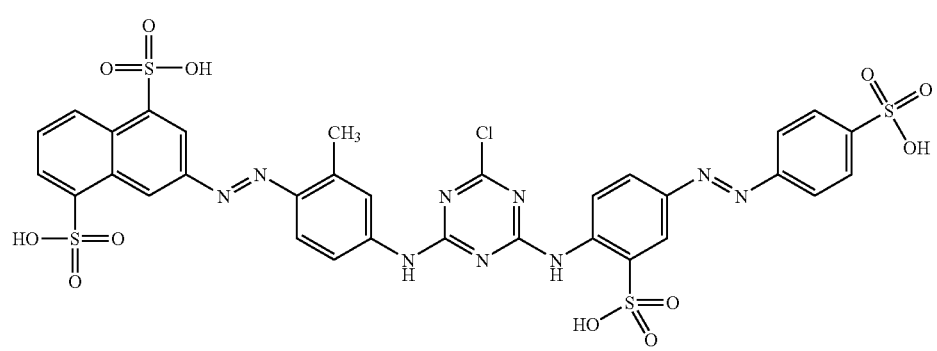

Intermediate (1b)

Intermediate (1a) (21.0 g, 0.05 mol), obtained from stage (a) above, was dissolved in water (200 ml) at pH 7, adjusted by the addition of 2N sodium carbonate. The resultant solution was then added at 0 to 5° C. to a suspension of cyanuric chloride (9.2 g, 0.05 mol) in acetone (100 ml) and water (300 g).

The pH of the resultant mixture was maintained at 6.5 (using 2N sodium carbonate solution) for a period of 1 hour, then the temperature was then allowed to warm to 20° C.

A solution of 4-amino-1,1'-azobenzene-3,4'-disulfonic acid obtained from Sigma-Aldrich Co (19.9 g, 0.05 mol) in water (200 ml) at pH 7 (2N sodium carbonate) was then added at a temperature of 20° C. The resultant mixture was stirred at 30 to 40° C. and a pH 7 to 8 (adjusted using 2N sodium hydroxide solution) for a period of 18 hours.

The product was precipitated by the addition of salt (NaCl), the precipitate was collected by filtration and the product, Intermediate (1b), was used in stage (c) without drying.

Stage (c): Preparation of Dye (1):

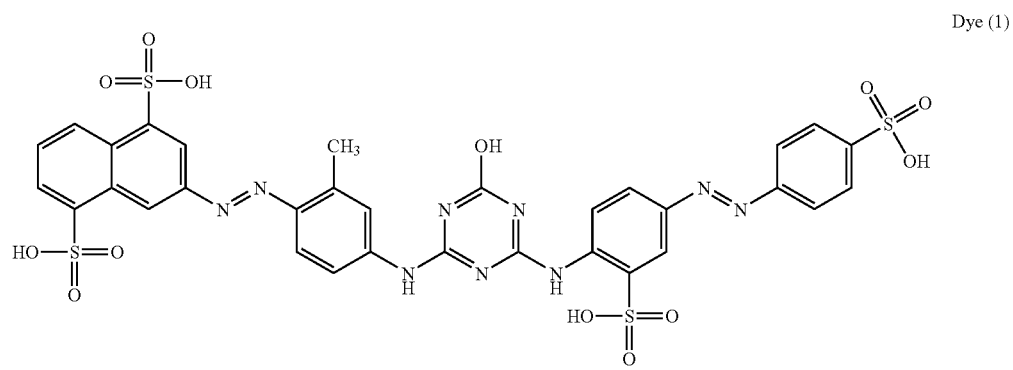
Dye (1)

A mixture of Intermediate (1b), obtained from stage (b) above, water (1000 ml) and 48% w/w sodium hydroxide solution (100 ml) was stirred at a temperature of from 60 to 70° C. for a period 2 hours and then allowed to cool to 20° C.

The resultant product was precipitated by the addition of salt (NaCl), the precipitate was collected by filtration, and the precipitate dissolved in water (500 ml) and purified by dialysis in membrane tubing to conductivity of less than 50 μS. After evaporation of the water at 60° C. Dye (1) was obtained as an orange solid.

EXAMPLE 2

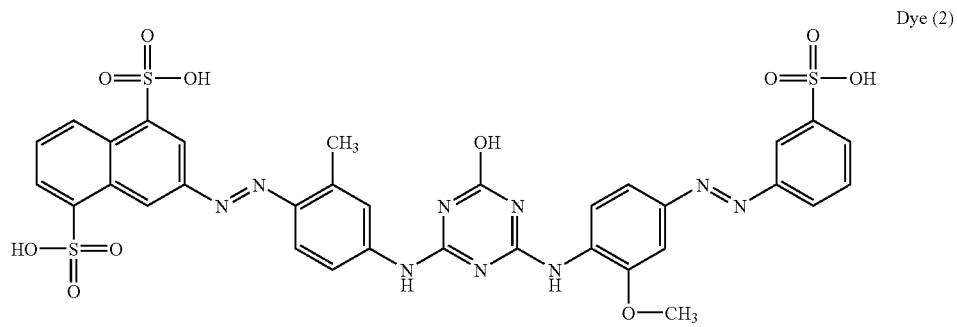
Dye (2)

Dye (2) was prepared by stages (a) to (c) described below:

Stage (a) Preparation of Intermediate (1a)

Intermediate (1a) was prepared as described above in Example 1, Stage (a).

Stage (b) Preparation of Intermediate (2b)

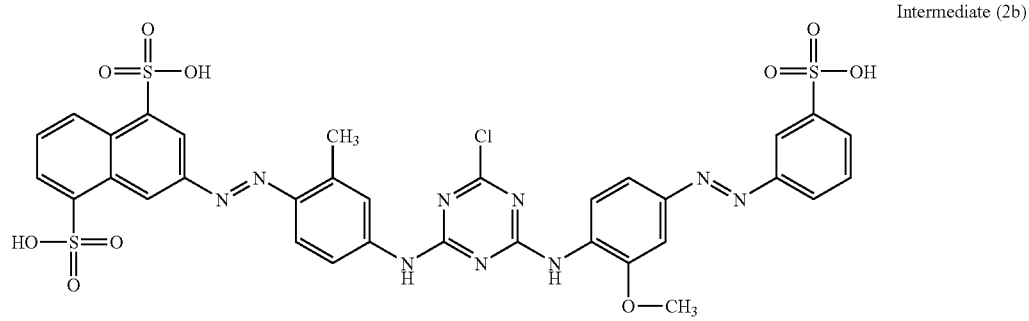

Intermediate (2b)

Intermediate (1a) (21.0 g, 0.05 mol), obtained from stage (a) above, was dissolved in water (200 ml) at pH 7, adjusted by the addition of 2N sodium carbonate. The resultant solution was then added at 0 to 5° C. to a suspension of cyanuric chloride (9.2 g, 0.05 mol) in acetone (100 ml) and water (300 g).

The pH of the resultant mixture was maintained at 6.5 (using 2N sodium carbonate solution) for a period of 1 hour, then the temperature was then allowed to warm to 20° C.

A solution of 4-amino-3-methoxyazobenzene-3'-sulfonic acid obtained from Pfaltz-Bauer (15.4 g, 0.05 mol) in water (200 ml) at pH 7 (2N sodium carbonate) was then added at a temperature of 20° C. The resultant mixture was stirred at 30 to 40° C. and a pH 7 to 8 (adjusted using 2N sodium hydroxide solution) for a period of 18 hours.

The product was precipitated by the addition of salt (NaCl), the precipitate was collected by filtration and the product, Intermediate (2b), was used in stage (c) without drying.

Stage (c): Preparation of Dye (2)

A mixture of Intermediate (2b), obtained from stage (b) above, water (1000 ml) and 48% w/w sodium hydroxide solution (100 ml) was stirred at a temperature of from 60 to 70° C. for a period 2 hours and then allowed to cool to 20° C.

The resultant product was precipitated by the addition of salt (NaCl), the precipitate was collected by filtration, and the precipitate dissolved in water (500 ml) and purified by dialysis in membrane tubing to conductivity of less than 50 μS. After evaporation of the water at 60° C. Dye (2) was obtained as an orange solid.

EXAMPLE 3

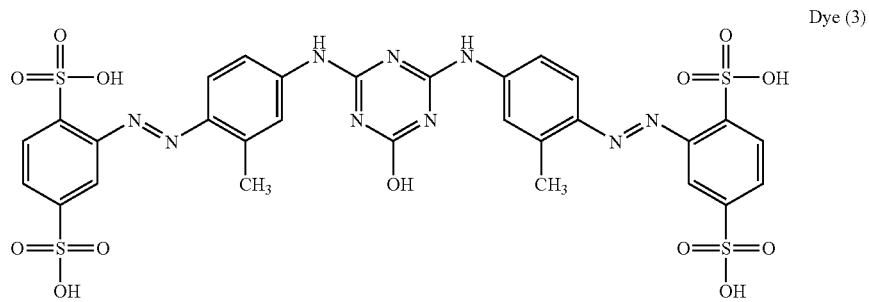

Dye (3)

Dye (3) was prepared by stages (a) to (c) described below:

Stage (a) Preparation of Intermediate (3a)

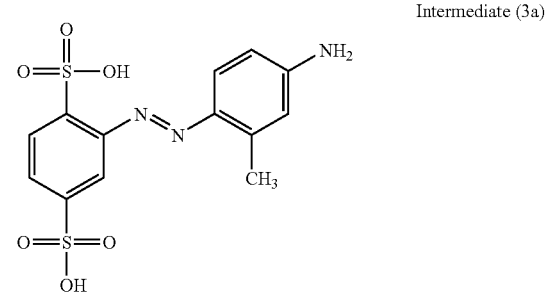

Intermediate (3a)

2-Aminonbenzene-1,4-disulfonic acid (110 g, 0.43 mol) was dissolved in water (800 ml) at a pH of 7 by the addition of 2N sodium hydroxide solution followed by the addition of sodium nitrite (32.6 g, 0.48 mol). The resultant solution was added dropwise to a mixture of concentrated hydrochloric acid (120 ml) and water (200 ml) at a temperature of from 0 to 5° C. to produce a diazonium salt.

The diazonium salt was stirred for 1 hour at a temperature of 0 to 5° C. and then any excess nitrous acid was destroyed by adding sulfamic acid. A solution of m-toluidine (46 g, 0.43 mol) was added dropwise at a temperature of from 0 to 5° C. and the pH was adjusted to 4-5 by adding sodium acetate. The resultant mixture was stirred for 4 hours at a temperature of 0 to 5° C. and then at 20° C. for a further 16 hours.

The resultant product was precipitated by the addition of salt (NaCl), the precipitate was collected by filtration and then dissolved in water (1000 ml) at a pH of 7 obtained by the addition of sodium hydroxide solution. The product was precipitated by the addition of sodium chloride (200 g), collected by filtration and dried in an oven at 60° C. to produce 82 g of a Intermediate (3a) in the form of a red solid.

Stage (b) Preparation of Intermediate (3b)

A second solution of Intermediate (3a) was prepared exactly as described above, and this was then added at a temperature of 20° C. The resultant mixture was stirred at 30 to 40° C. and a pH 7 to 8 (adjusted using 2N sodium hydroxide solution) for a period of 18 hours.

The product was precipitated by the addition of salt (NaCl), the precipitate was collected by filtration and the product, Intermediate (3b), was used in stage (c) without drying.

Stage (c): Preparation of Dye (3)

A mixture of Intermediate (3b), obtained from stage (b) above, water (1000 ml) and 48% w/w sodium hydroxide solution (100 ml) was stirred at a temperature of from 60 to 70° C. for a period 2 hours and then allowed to cool to 20° C.

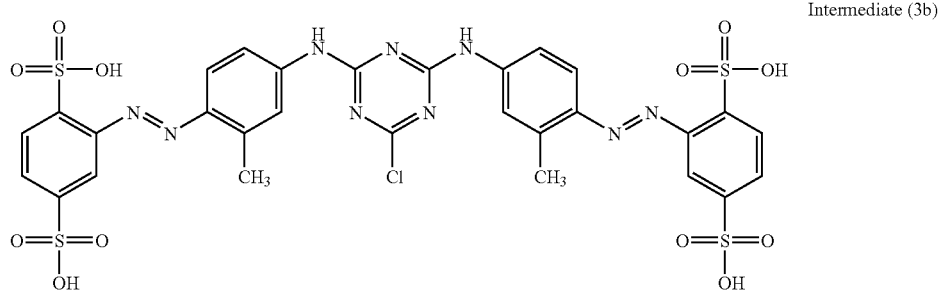

Intermediate (3b)

Intermediate (3a) (22.1 g, 0.05 mol), obtained from stage (a) above, was dissolved in water (200 ml) at pH 7, adjusted by the addition of 2N sodium carbonate. The resultant solution was then added at 0 to 5° C. to a suspension of cyanuric chloride (9.2 g, 0.05 mol) in acetone (100 ml) and water (300 g).

The pH of the resultant mixture was maintained at 6.5 (using 2N sodium carbonate solution) for a period of 1 hour, then the temperature was then allowed to warm to 20° C.

The resultant product was precipitated by the addition of salt (NaCl), the precipitate was collected by filtration, and the precipitate dissolved in water (500 ml) and purified by dialysis in membrane tubing to conductivity of less than 50 μS. After evaporation of the water at 60° C. Dye (3) was obtained as an orange solid.

EXAMPLE 4

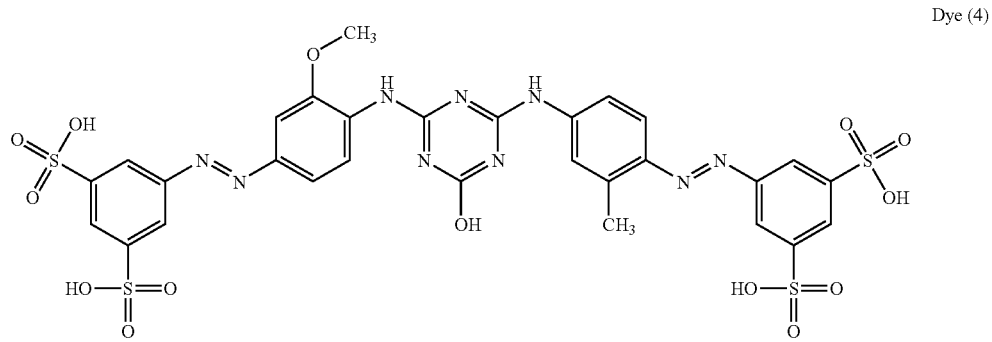

Dye (4)

Dye (4) was prepared by stages (a) to (d) described below:

Stage (a) Preparation of Intermediate (4a)

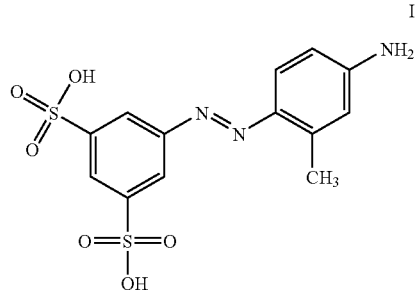

Intermediate (4a)

Stage (b) Preparation of Intermediate (4b)

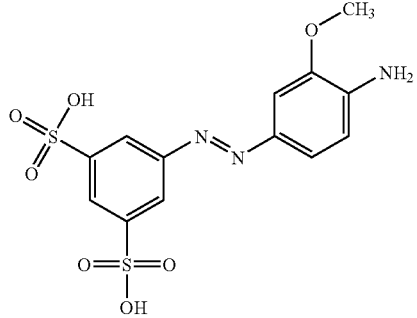

Intermediate (4b)

Intermediate (4b) was prepared according to the above method for intermediate (4a), wherein m-toluidine was replaced with o-anisidine.

Stage (c) Preparation of Intermediate (4c)

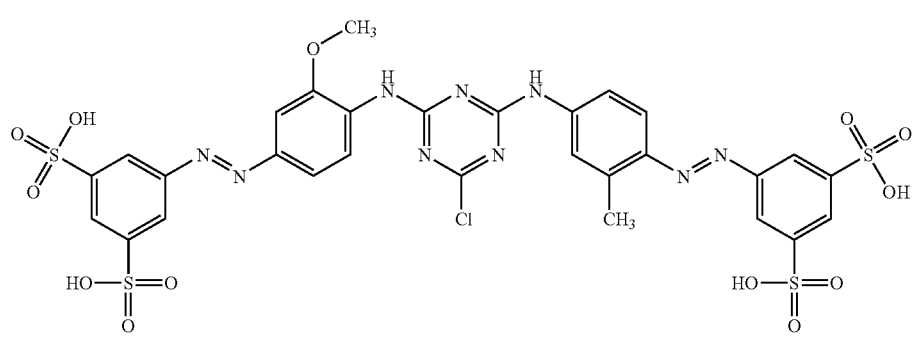

Intermediate (4c)

5-Aminonbenzene-1,3-disulfonic acid (110 g, 0.43 mol) was dissolved in water (800 ml) at a pH of 7 by the addition of 2N sodium hydroxide solution followed by the addition of sodium nitrite (32.6 g, 0.48 mol). The resultant solution was added dropwise to a mixture of concentrated hydrochloric acid (120 ml) and water (200 ml) at a temperature of from 0 to 5° C. to produce a diazonium salt.

The diazonium salt was stirred for 1 hour at a temperature of 0 to 5° C. and then any excess nitrous acid was destroyed by adding sulfamic acid. A solution of m-toluidine (46 g, 0.43 mol) was added dropwise at a temperature of from 0 to 5° C. and the pH was adjusted to 4-5 by adding sodium acetate. The resultant mixture was stirred for 4 hours at a temperature of 0 to 5° C. and then at 20° C. for a further 16 hours.

The resultant product was precipitated by the addition of salt (NaCl), the precipitate was collected by filtration and then dissolved in water (1000 ml) at a pH of 7 obtained by the addition of sodium hydroxide solution. The product was precipitated by the addition of sodium chloride (200 g), collected by filtration and dried in an oven at 60° C. to produce 82 g of a Intermediate (4a) in the form of a red solid.

Intermediate (4a) (18.6 g, 0.05 mol), obtained from stage (a) above, was dissolved in water (200 ml) at pH 7, adjusted by the addition of 2N sodium carbonate. The resultant solution was then added at 0 to 5° C. to a suspension of cyanuric chloride (9.2 g, 0.05 mol) in acetone (100 ml) and water (300 g).

The pH of the resultant mixture was maintained at 6.5 (using 2N sodium carbonate solution) for a period of 1 hour, then the temperature was then allowed to warm to 20° C.

A solution of the product from stage (b) (19.4 g, 0.05 mol) in water (200 ml) at pH 7 (2N sodium carbonate) was then added at a temperature of 20° C. The resultant mixture was stirred at 30 to 40° C. and a pH 7 to 8 (adjusted using 2N sodium hydroxide solution) for a period of 18 hours.

The product was precipitated by the addition of salt (NaCl), the precipitate was collected by filtration and the product, Intermediate (4c), was used in stage (d) without drying.

Stage (d): Preparation of Dye (4):

A mixture of Intermediate (4c), obtained from stage (c) above, water (1000 ml) and 48% w/w sodium hydroxide solution (100 ml) was stirred at a temperature of from 60 to 70° C. for a period 2 hours and then allowed to cool to 20° C.

The resultant product was precipitated by the addition of salt (NaCl), the precipitate was collected by filtration, and the precipitate dissolved in water (500 ml) and purified by dialysis in membrane tubing to conductivity of less than 50 μS. After evaporation of the water at 60° C. Dye (4) was obtained as an orange solid.

EXAMPLE 5

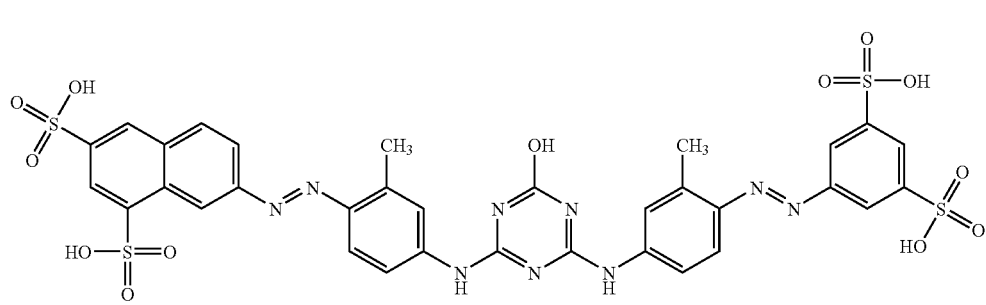

Dye (5)

Dye (5) was prepared by stages (a) to (d) described below:

Stage (a) Preparation of Intermediate (5a)

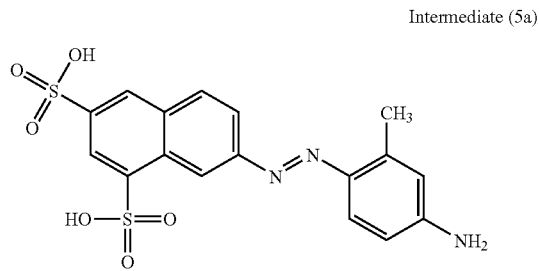

Intermediate (5a)

7-Aminonaphthalene-1,3-disulfonic acid (129 g, 0.43 mol) was dissolved in water (800 ml) at a pH of 7 by the addition of 2N sodium hydroxide solution followed by the addition of sodium nitrite (32.6 g, 0.48 mol). The resultant solution was added dropwise to a mixture of concentrated hydrochloric to produce a diazonium salt.

The diazonium salt was stirred for 1 hour at a temperature of 0 to 5° C. and then any excess nitrous acid was destroyed by adding sulfamic acid. A solution of m-toluidine (46 g, 0.43 mol) was added dropwise at a temperature of from 0 to 5° C. and the pH was adjusted to 4-5 by adding sodium acetate. The resultant mixture was stirred for 4 hours at a temperature of 0 to 5° C. and then at 20° C. for a further 16 hours.

=The resultant product was precipitated by the addition of salt (NaCl), the precipitate was collected by filtration and then dissolved in water (1000 ml) at a pH of 7 obtained by the addition of sodium hydroxide solution. The product was precipitated by the addition of sodium chloride (200 g), collected by filtration and dried in an oven at 60° C. to produce 82 g of a Intermediate (5a) in the form of a red solid.

Stage (b) Preparation of Intermediate (5b)

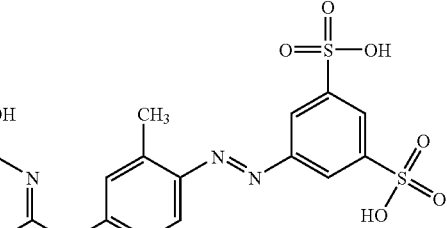

Intermediate (5b)

Intermediate (5b) is prepared according to the above method for intermediate (5a), wherein 7-aminonaphthalene-1,3-disulfonic acid was replaced with 5-aminonbenzene-1,3-disulfonic acid.

Stage (c) Preparation of Intermediate (5c)

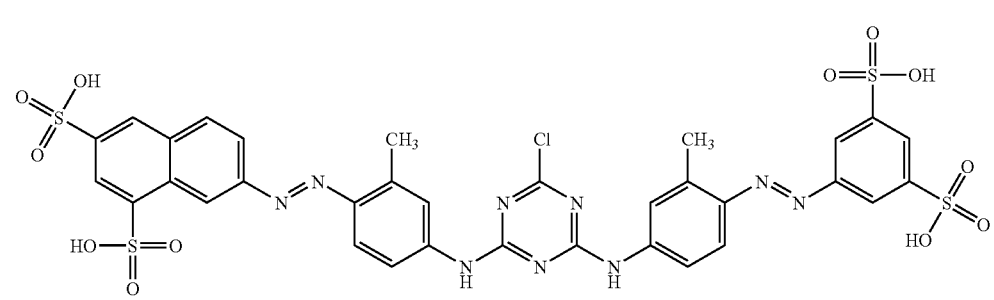

Intermediate (5c)

Intermediate (5a) (21.0 g, 0.05 mol), obtained from stage (a) above, was dissolved in water (200 ml) at pH 7, adjusted by the addition of 2N sodium carbonate. The resultant solution was then added at 0 to 5° C. to a suspension of cyanuric chloride (9.2 g, 0.05 mol) in acetone (100 ml) and water (300 g).

The pH of the resultant mixture was maintained at 6.5 (using 2N sodium carbonate solution) for a period of 1 hour, then the temperature was then allowed to warm to 20° C.

A solution of the product from stage (b) (18.6 g, 0.05 mol) in water (200 ml) at pH 7 (2N sodium carbonate) was then added at a temperature of 20° C. The resultant mixture was stirred at 30 to 40° C. and a pH 7 to 8 (adjusted using 2N sodium hydroxide solution) for a period of 18 hours.

The product was precipitated by the addition of salt (NaCl), the precipitate was collected by filtration and the product, Intermediate (5c), is used in stage (d) without drying.

Stage (d): Preparation of Dye (5):

A mixture of Intermediate (5c), obtained from stage (c) above, water (1000 ml) and 48% w/w sodium hydroxide solution (100 ml) was stirred at a temperature of from 60 to 70° C. for a period 2 hours and then allowed to cool to 20° C. The resultant product was precipitated by the addition of salt (NaCl), the precipitate was collected by filtration, and the precipitate dissolved in water (500 ml) and purified by dialysis in membrane tubing to conductivity of less than 50 μS. After evaporation of the water at 60° C. Dye (5) was obtained as an orange solid.

sodium nitrite (32.6 g, 0.48 mol). The resultant solution was added dropwise to a mixture of concentrated hydrochloric to produce a diazonium salt.

The diazonium salt was stirred for 1 hour at a temperature of 0 to 5° C. and then any excess nitrous acid was destroyed by adding sulfamic acid. A solution of m-toluidine (46 g, 0.43 mol) was added dropwise at a temperature of from 0 to 5° C. and the pH was adjusted to 4-5 by adding sodium acetate. The resultant mixture was stirred for 4 hours at a temperature of 0 to 5° C. and then at 20° C. for a further 16 hours.

The resultant product was precipitated by the addition of salt, the precipitate was collected by filtration and then dissolved in water (1000 ml) at a pH of 7 obtained by the addition of sodium hydroxide solution. The product was precipitated by the addition of sodium chloride (200 g), collected by filtration and dried in an oven at 60° C. to produce 82 g of a Intermediate (6a) in the form of a red solid.

EXAMPLE 6

Stage (b) Preparation of Intermediate (6b)

Dye (6)

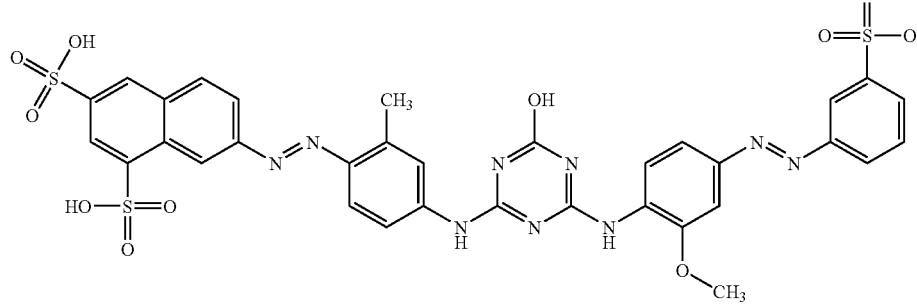

Dye (6) was prepared by stages (a) to (c) described below:

Stage (a) Preparation of Intermediate (6a)

Intermediate (6a)

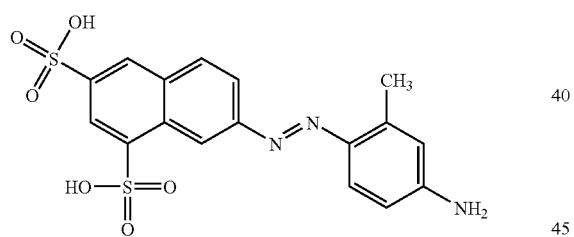

7-Aminonaphthalene-1,3-disulfonic acid (129 g, 0.43 mol) was dissolved in water (800 ml) at a pH of 7 by the addition of 2N sodium hydroxide solution followed by the addition of Intermediate (6b)

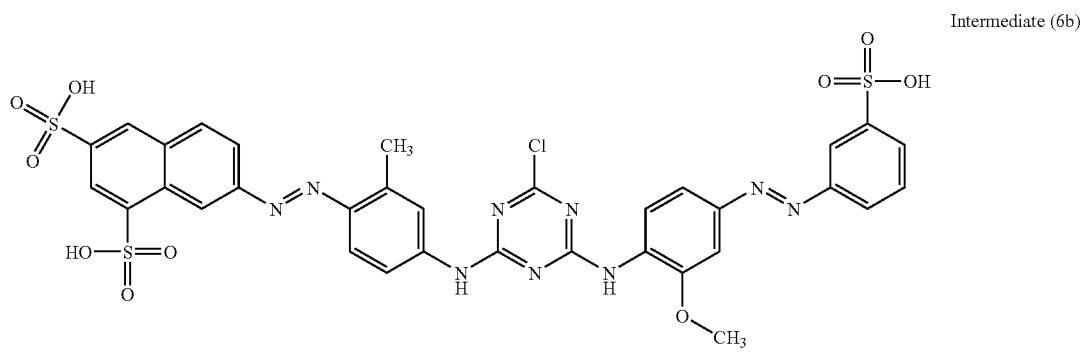

Intermediate (6a) (21.0 g, 0.05 mol), obtained from stage (a) above, was dissolved in water (200 ml) at pH 7, adjusted by the addition of 2N sodium carbonate. The resultant solution was then added at 0 to 5° C. to a suspension of cyanuric chloride (9.2 g, 0.05 mol) in acetone (100 ml) and water (300 g).

The pH of the resultant mixture was maintained at 6.5 (using 2N sodium carbonate solution) for a period of 1 hour, then the temperature was then allowed to warm to 20° C.

A solution of 4-amino-3-methoxyazobenzene-3'-sulphonic acid obtained from Pfaltz-Bauer (15.4 g, 0.05 mol) in water (200 ml) at pH 7 (2N sodium carbonate) was then added at a temperature of 20° C. The resultant mixture was stirred at 30 to 40° C. and a pH 7 to 8 (adjusted using 2N sodium hydroxide solution) for a period of 18 hours.

The product was precipitated by the addition of salt (NaCl), the precipitate was collected by filtration and the product, Intermediate (6b), was used in stage (c) without drying.

Stage (c): Preparation of Dye (6):

A mixture of Intermediate (6b), obtained from stage (b) above, water (1000 ml) and 48% w/w sodium hydroxide solution (100 ml) was stirred at a temperature of from 60 to 70° C. for a period 2 hours and then allowed to cool to 20° C.

The resultant product was precipitated by the addition of salt (NaCl), the precipitate was collected by filtration, and the precipitate dissolved in water (500 ml) and purified by dialysis in membrane tubing to conductivity of less than 50 µS. After evaporation of the water at 60° C. Dye (6) was obtained as an orange solid.

Inks

The inks described in Tables I and II may be prepared comprising the Dyes indicated or for that matter any of the compounds of Formula (1) or a salt thereof. Numbers quoted in the second column onwards refer to the number of parts of the relevant components and all parts are by weight. The inks may be applied to paper by thermal or piezo ink jet printing.

The following abbreviations are used in Table I and II:

PG=propylene glycol

DEG=diethylene glycol

NMP=N-methylpyrollidone

DMK=dimethylketone

IPA=isopropanol

MeOH=methanol

2P=2-pyrollidone

MIBK=methylisobutyl ketone

P12=propane-1,2-diol

BDL=butane-2,3-diol

CET=cetyl ammonium bromide

PHO=$Na_2HPO_4$

TBT=tertiary butanol

TDG=thiodiglycol

TABLE I

| Dye | Dye Content | Water | PG | DEG | NMP | DMK | NaOH | Na Stearate | IPA | MEOH | 2P | MIBK |
|---|---|---|---|---|---|---|---|---|---|---|---|---|
| 1 | 2.0 | 80 | 5 | | 6 | 4 | | | | | 5 | |
| 2 | 3.0 | 90 | | 5 | 5 | | | 0.2 | | | | |
| 3 | 10.0 | 85 | 3 | | 3 | 3 | | | | 5 | 1 | |
| 4 | 2.1 | 91 | | 8 | | | | | | | | 1 |
| 5 | 3.1 | 86 | 5 | | | | | 0.2 | 4 | | | 5 |
| 6 | 1.1 | 81 | | | 9 | | 0.5 | 0.5 | | | 9 | |
| 1 | 2.5 | 60 | 4 | 15 | 3 | 3 | | | 6 | 10 | 5 | 4 |
| 2 | 5 | 65 | | 20 | | | | | 10 | | | |
| 3 | 2.4 | 75 | 5 | 4 | | 5 | | | | 6 | | 5 |
| 4 | 4.1 | 80 | 3 | 5 | 2 | 10 | | 0.3 | | | | |
| 5 | 3.2 | 65 | | 5 | 4 | 6 | | | 5 | 4 | 6 | 5 |
| 6 | 5.1 | 96 | | | | | | | | 4 | | |
| 1 | 10.8 | 90 | 5 | | | | | | 5 | | | |
| 2 | 10.0 | 80 | 2 | 6 | 2 | 5 | | | 1 | | 4 | |
| 3 | 1.8 | 80 | | 5 | | | | | | | 15 | |
| 4 | 2.6 | 84 | | | 11 | | | | | | 5 | |
| 5 | 3.3 | 80 | 2 | | | 10 | | | | 2 | | 6 |
| 6 | 12.0 | 90 | | | | 7 | 0.3 | | 3 | | | |
| 1 | 5.4 | 69 | 2 | 20 | 2 | 1 | | | | | 3 | 3 |
| 2 | 6.0 | 91 | | | 4 | | | | | | 5 | |

TABLE II

| Dye | Dye Content | Water | PG | DEG | NMP | CET | TBT | TDG | BDL | PHO | 2P | PI2 |
|---|---|---|---|---|---|---|---|---|---|---|---|---|
| 3 | 3.0 | 80 | 15 | | | 0.2 | | | | | 5 | |
| 4 | 9.0 | 90 | | 5 | | | | | | 1.2 | | 5 |
| 5 | 1.5 | 85 | 5 | 5 | | 0.15 | 5.0 | 0.2 | | | | |
| 6 | 2.5 | 90 | | | 6 | 4 | | | | 0.12 | | |
| 1 | 3.1 | 82 | 4 | 8 | | 0.3 | | | | | | 6 |
| 2 | 0.9 | 85 | | | 10 | | | | 5 | 0.2 | | |
| 3 | 8.0 | 90 | | 5 | 5 | | | 0.3 | | | | |
| 4 | 4.0 | 70 | | 10 | 4 | | | | 1 | | 4 | 11 |
| 5 | 2.2 | 75 | 4 | 10 | 3 | | | | 2 | | 6 | |
| 6 | 10.0 | 91 | | | 6 | | | | | | 3 | |

TABLE II-continued

| Dye | Dye Content | Water | PG | DEG | NMP | CET | TBT | TDG | BDL | PHO | 2P | PI2 |
|---|---|---|---|---|---|---|---|---|---|---|---|---|
| 1 | 9.0 | 76 |   | 9  | 7 |     | 3.0 |    |   | 0.95 | 5  |   |
| 2 | 5.0 | 78 | 5 | 11 |   |     |     |    |   |      | 6  |   |
| 3 | 5.4 | 86 |   |    | 7 |     |     |    |   |      | 7  |   |
| 4 | 2.1 | 70 | 5 | 5  | 5 | 0.1 | 0.2 | 0.1 | 5 | 0.1  | 5  |   |
| 5 | 2.0 | 90 |   | 10 |   |     |     |    |   |      |    |   |
| 6 | 2   | 88 |   |    |   |     |     | 10 |   |      |    |   |
| 1 | 5   | 78 |   |    | 5 |     |     | 12 |   |      | 5  |   |
| 1 | 8   | 70 | 2 |    | 8 |     |     | 15 |   |      | 5  |   |
| 1 | 10  | 80 |   |    |   |     |     | 8  |   |      | 12 |   |
| 1 | 10  | 80 |   | 10 |   |     |     |    |   |      |    |   |

The invention claimed is:

1. A compound of Formula (1) or a salt thereof:

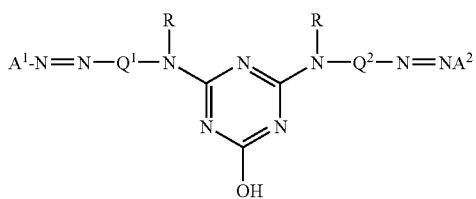

Formula (1)

wherein:
- $A^1$ is optionally substituted phenyl;
- $A^2$ is optionally substituted aryl;
- $Q^1$ and $Q^2$ are each independently an optionally substituted phenylene ring which is para connected to the —N=N— and the —NR— groups shown in Formula (1);

when present the substituents on $Q^1$ and $Q^2$ are selected from the group consisting of $C_{1-4}$-alkoxy, $C_{1-4}$-alkyl, —NH-CONH$_2$, —NHSO$_2$—$C_{1-4}$-alkyl, —SO$_3$H and —PO$_3$H$_2$; and each R independently is H or a substituent;

with the provisos that:
(i) the compound of Formula (1) has at least one group selected from the group consisting of —SO$_3$H and —PO$_3$H$_2$ groups;
(ii) the compound of Formula (1) has more groups selected from the group consisting of —SO$_3$H and —PO$_3$H$_2$ groups than the total number of —CO$_2$H and —COSH groups; and
(iii) the compound of Formula (1) has only two azo groups.

2. A compound according to claim 1 wherein $A^2$ is optionally substituted naphthyl or phenyl.

3. A compound according to claim 1 wherein both groups represented by R are H.

4. A compound according to claim 1 wherein $A^1$ and $A^2$ are free from —CO$_2$H and —COSH groups.

5. A compound according to claim 1 which has no —CO$_2$H and —COSH groups.

6. A compound according to claim 1 having from 1 to 6 groups selected from the group consisting of —SO$_3$H and —PO$_3$H$_2$ groups.

7. A compound of Formula (1) or a salt thereof according to claim 1 which is any one of Formulae (8), (9), (11) and (14) or a salt thereof:

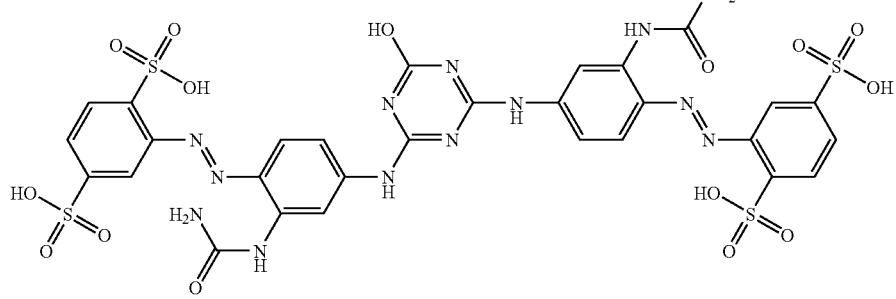

Formula (8)

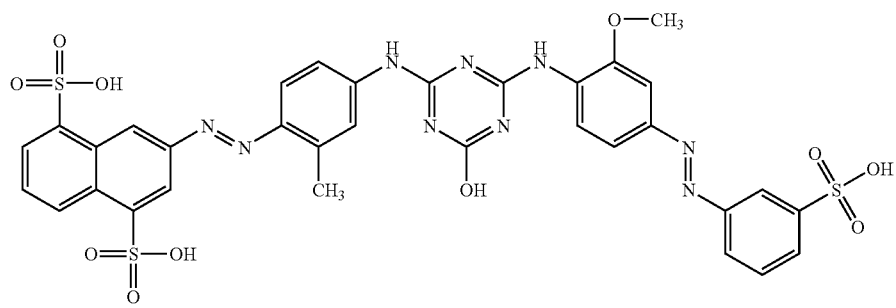

Formula (9)

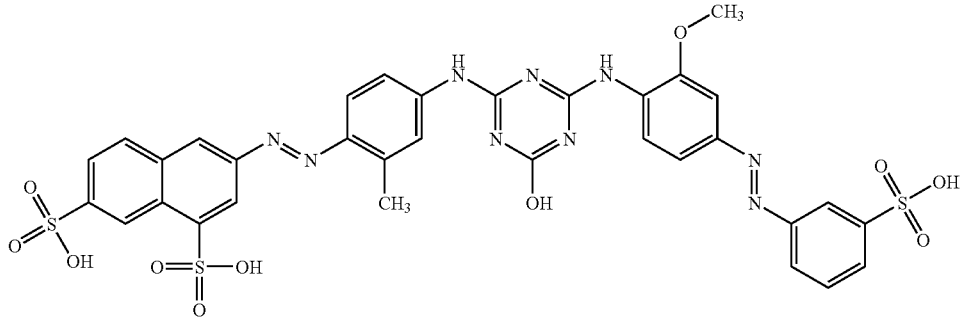

Formula (11)

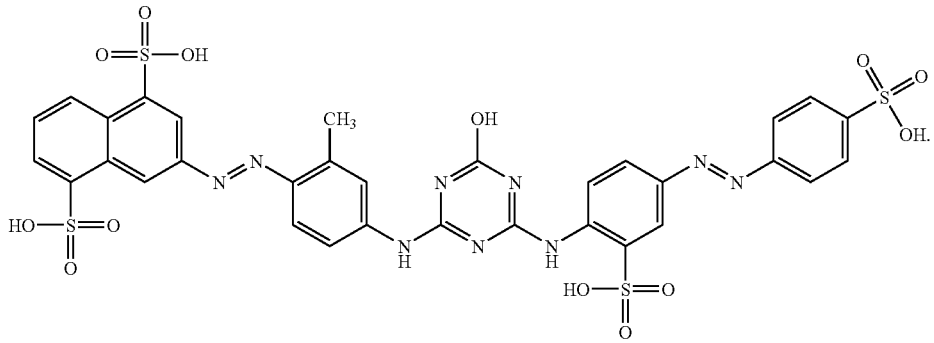

Formula (14)

8. An ink comprising a compound of Formula (1) or a salt thereof according to claim 1 and a medium.

9. An ink according to claim 8 wherein the medium is a liquid.

10. An ink according to claim 9 comprising:
(a) from 0.01 to 30 parts of the compound of Formula (1) or a salt thereof; and
(b) from 70 to 99.99 parts of a liquid medium;
wherein all parts are by weight and the number of parts of (a)+(b)=100.

11. A process for printing an image on a substrate which comprises applying to the substrate by means of an ink jet printer an ink comprising a compound of Formula (1) or a salt thereof:

Formula (1)

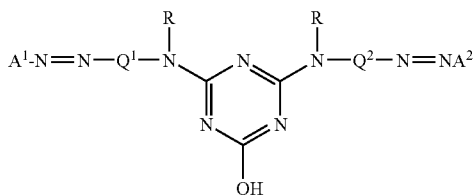

wherein:
A$^1$ is optionally substituted phenyl;
A$^2$ is optionally substituted aryl;

Q$^1$ and Q$^2$ are each independently an optionally substituted phenylene ring which is para connected to the —N═N— and the —NR— groups shown in Formula (1);

when present the substituents on Q$^1$ and Q$^2$ are selected from the group consisting of C$_{1-4}$-alkoxy, C$_{1-4}$-alkyl, —NH-CONH$_2$, —NHSO$_2$—C$_{1-4}$-alkyl, —SO$_3$H and —PO$_3$H$_2$; and
each R independently is H or a substituent;

with the provisos that:
(i) the compound of Formula (1) has at least one group selected from the group consisting of —SO$_3$H and —PO$_3$H$_2$ groups; and
(ii) the compound of Formula (1) has more groups selected from the group consisting of —SO$_3$H and —PO$_3$H$_2$ groups than the total number of —CO$_2$H and —COSH groups; and
(iii) the compound of Formula (1) has only two azo groups.

12. A substrate printed with an ink comprising a compound of Formula (1) or a salt thereof according to claim 1.

13. An ink jet printer cartridge comprising a chamber and ink, wherein the ink is present in the chamber and the ink comprises a compound of Formula (1) or a salt thereof according to claim 1.

* * * * *